(12) United States Patent
Kajiyama et al.

(10) Patent No.: US 10,790,761 B2
(45) Date of Patent: Sep. 29, 2020

(54) POWER CONVERSION DEVICE AND DC POWER TRANSMISSION SYSTEM

(71) Applicant: Mitsubishi Electric Corporation, Chiyoda-ku (JP)

(72) Inventors: Takuya Kajiyama, Chiyoda-ku (JP); Takeshi Kikuchi, Chiyoda-ku (JP); Kaho Mukunoki, Chiyoda-ku (JP); Osamu Mori, Chiyoda-ku (JP); Toshiyuki Fujii, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/479,252

(22) PCT Filed: Feb. 27, 2017

(86) PCT No.: PCT/JP2017/007501
§ 371 (c)(1),
(2) Date: Jul. 19, 2019

(87) PCT Pub. No.: WO2018/154783
PCT Pub. Date: Aug. 30, 2018

(65) Prior Publication Data
US 2019/0386578 A1 Dec. 19, 2019

(51) Int. Cl.
*H02M 1/36* (2007.01)
*H02M 7/155* (2006.01)
(Continued)

(52) U.S. Cl.
CPC .......... *H02M 7/1557* (2013.01); *H02M 1/36* (2013.01); *H02M 5/458* (2013.01);
(Continued)

(58) Field of Classification Search
CPC .......... H02H 7/268; H02M 2007/4835; H02M 1/36; H02J 3/36
See application file for complete search history.

(56) References Cited

U.S. PATENT DOCUMENTS

| 2013/0193766 A1* | 8/2013 | Irwin | H02H 7/268 |
| | | | 307/82 |
| 2013/0208519 A1 | 8/2013 | Yamamoto et al. | |

(Continued)

FOREIGN PATENT DOCUMENTS

JP  2014-180131 A  9/2014

OTHER PUBLICATIONS

International Search Report dated Apr. 25, 2017 in PCT/JP2017/007501 filed Feb. 27, 2017.

(Continued)

*Primary Examiner* — Harry R Behm
(74) *Attorney, Agent, or Firm* — Xsensus LLP

(57) ABSTRACT

A DC power transmission system interconnects a plurality of AC systems via a DC line. A plurality of power conversion devices are connected between the plurality of AC systems and the DC line. One of the plurality of power conversion devices controls the voltage on the DC line, while the remaining power conversion device controls a current input and output to and from the DC line. In a restart which resumes power conversion from a stopped state for controlling a DC current on the DC line, the power conversion device performing current control monitors the voltage on the DC line and starts a restart operation without transmitting or receiving information to or from the other power conversion device.

19 Claims, 16 Drawing Sheets

(51) Int. Cl.
  *H02M 5/458* (2006.01)
  *H02M 7/5387* (2007.01)
  *H02M 7/483* (2007.01)
  *H02H 7/26* (2006.01)

(52) U.S. Cl.
  CPC ..... *H02M 7/1552* (2013.01); *H02M 7/53875* (2013.01); *H02H 7/268* (2013.01); *H02M 2007/4835* (2013.01)

(56) References Cited

U.S. PATENT DOCUMENTS

| | | | | |
|---|---|---|---|---|
| 2015/0340859 | A1* | 11/2015 | Barker | H02H 7/268 |
| | | | | 361/62 |
| 2017/0040855 | A1* | 2/2017 | Saint-Michel | H02K 1/2766 |
| 2017/0331393 | A1* | 11/2017 | Whitehouse | H02M 7/49 |
| 2018/0013280 | A1* | 1/2018 | Barker | H02H 3/066 |
| 2018/0076619 | A1* | 3/2018 | Gupta | H02J 3/36 |
| 2018/0076735 | A1* | 3/2018 | Bakran | H02H 9/02 |
| 2018/0120367 | A1* | 5/2018 | Lewis | G01R 31/085 |

OTHER PUBLICATIONS

Extended European Search Report dated Jan. 27, 2020 in corresponding European Patent Application No. 17897560.3, 10 pages.

* cited by examiner

POWER CONVERSION DEVICE AND DC POWER TRANSMISSION SYSTEM

TECHNICAL FIELD

The present invention relates to a power conversion device and a direct-current (DC) power transmission system, and more particularly to a DC power transmission system for interconnecting a plurality of alternate-current (AC) systems via a DC line and a power conversion device used therefor.

BACKGROUND ART

In a system where electric power is transmitted over a long distance, a DC power transmission system based on high voltage is often used. A DC power transmission system, in a configuration in which a plurality of AC systems are connected via a DC line, can convert AC power from one AC system to DC power of high voltage by a forward converter and transmit the DC power via a DC line and also convert DC power on the DC line to AC power by an inverter and supply it to another AC system to thus transmit power.

A modular multi-level converter (hereinafter also referred to as MMC) is used as one of power conversion devices suitable for a DC power transmission system. The MMC has arms composed of a plurality of unit converters (or cells) connected in multiple stages between two DC terminals via an AC terminal. Each cell comprises a plurality of semiconductor switches and a DC capacitor, and its configuration has variations such as a chopper circuit or a bridge circuit.

For example, Japanese Patent Laying-Open No. 2014-180131 (Patent Literature 1) discloses that when a DC line has an accident, a restart operation is performed such that while an AC circuit breaker is opened, energy accumulated in a capacitor of a converter cell composed of a chopper circuit is supplied to the DC line. This can increase the voltage of the DC line to restart the power conversion device rapidly.

CITATION LIST

Patent Literature

PTL 1: Japanese Patent Laying-Open No. 2014-180131

SUMMARY OF INVENTION

Technical Problem

In a DC power transmission system, when a DC line has an accident, it is necessary to temporarily disconnect each of a plurality of AC systems and also stop a plurality of power conversion devices respectively connected between the DC line and the plurality of AC systems.

When a temporary accident due to a lightning strike or the like occurs, and the cause of the accident is removed, the plurality of power conversion devices can be restarted to resume power transmission by flow of power. In doing so, however, when each power conversion device performs a restart operation randomly, the power conversion device starts to operate while whether the system has recovered soundness is insufficiently confirmed, so that the system as a whole may operate unstably.

In contrast, if each power conversion device is operated with confirmation by exchanging information among the plurality of power conversion devices, rapid restart may be prevented by an increase of a processing time including communication time.

The present invention has been made to solve such a problem, and an object thereof is to provide a power conversion device used in a DC power transmission system for interconnecting a plurality of AC systems via a DC line, that allows restart from a stopped state quickly and stably without needing to transmit and receive information to and from another power conversion device.

Solution to Problem

A power conversion device according to the present disclosure is a power conversion device which is used in a DC power transmission system for interconnecting a plurality of AC systems via a DC line, and comprises a power conversion unit, a current breaker, and a terminal control device. The power conversion unit is configured to bidirectionally perform AC to DC or DC to AC power conversion (hereinafter also referred to as AC/DC power conversion) between one of the plurality of AC systems and the DC line. The current breaker is configured to interrupt a current flowing between the one AC system and the DC line via the power conversion unit. The terminal control device controls the current breaker and the power conversion unit. The power conversion unit includes first and second DC terminals electrically connected to the DC line, AC terminals electrically connected to the AC system, and a plurality of converter cells. The plurality of converter cells are connected in series between the first and second DC terminals so as to have a point of electrical connection to the AC terminals. Each converter cell has a power storage element connected between a pair of output terminals, and a plurality of switching elements for controlling charging and discharging the power storage element between the output terminals. The plurality of switching elements are connected in parallel or in series to the power storage element for the output terminals. In a stopped state, the power conversion device has the current breaker opened and is in a gate blocked state in which in the power conversion unit each converter cell has the plurality of switching elements fixed in an off state. In a restart operation for starting AC/DC power conversion from the stopped state for controlling a direct current to be input/output to/from the DC line, the terminal control device operates in response to a DC terminal voltage and the voltage of the power storage element to remove the stopped state and start the AC/DC power conversion by turning on/off the plurality of switching elements in the plurality of converter cells.

Advantageous Effects of Invention

According to the present disclosure, a power conversion device used in a DC power transmission system for interconnecting a plurality of AC systems via a DC line, allows restart from a stopped state quickly and stably without requiring communication with another power conversion device.

DESCRIPTION OF EMBODIMENTS

Hereinafter, embodiments of the present invention will specifically be described with reference to the drawings. Hereinafter, identical or corresponding components in the figures are identically denoted and will not be described redundantly in principle.

First Embodiment

Figure 1:
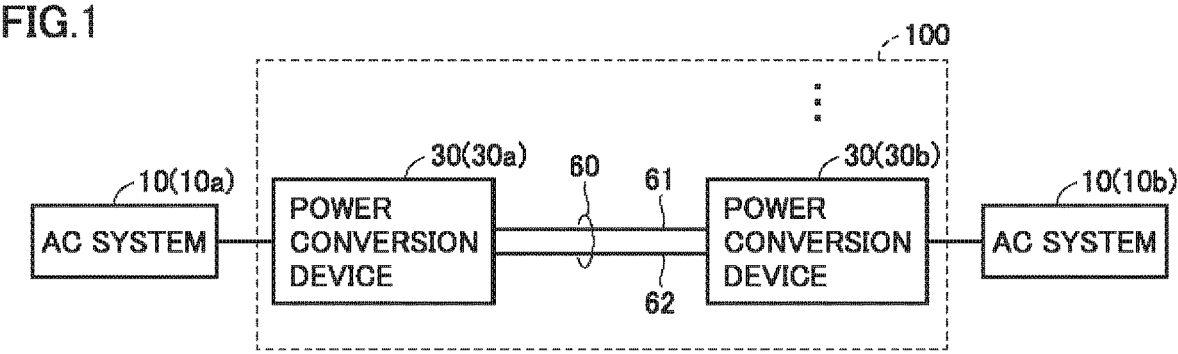
FIG. 1 is a schematic block diagram for illustrating an exemplary configuration of a DC power transmission system to which a power conversion device according to an embodiment is applied.

FIG. 1 is a schematic block diagram for illustrating an exemplary configuration of a DC power transmission system to which a power conversion device according to the present embodiment is applied.

Referring to FIG. 1, a DC power transmission system 100 interconnects a plurality of AC systems 10a and 10b via a DC line 60. DC power transmission system 100 includes DC line 60 and a plurality of power conversion devices 30s. Power conversion device 30 is disposed between each AC system 10 interconnected by DC power transmission system 100 and DC line 60. DC line 60 has a power line 61 corresponding to a DC bus of a high-voltage side and a power line 62 corresponding to a DC bus of a low-voltage side.

In the exemplary configuration shown in FIG. 1, a power conversion device 30a is disposed between AC system 10a and DC line 60, and a power conversion device 30b is disposed between AC system 10b and DC line 60. Power conversion device 30a performs bidirectional AC/DC power conversion between AC system 10a and DC line 60. Similarly, power conversion device 30b performs bidirectional AC/DC power conversion between AC system 10b and DC line 60.

Hereinafter, when the plurality of AC systems 10a and 10b are collectively described, they are simply referred to as an AC system 10. Likewise, power conversion devices 30a and 30b arranged to correspond to the plurality of AC systems 10a and 10b, respectively, are also simply referred to as a power conversion device 30 when they are referred to collectively.

In DC power transmission system 100, the plurality of power conversion devices 30s are classified into a power conversion device which controls a DC voltage on DC line 60 and a power conversion device which controls a DC current (or DC power) flowing between DC line 60 and an AC system corresponding thereto. Normally, one of the plurality of power conversion devices 30s is responsible for voltage control, and each of the remaining power conversion devices each performs current control.

For example, while a power conversion device connected to an AC system on a power generation side can be responsible for voltage control, the other power conversion devices can perform current control. However, when each power conversion device 30 is configured to be capable of performing bidirectional AC/DC power conversion, then, depending on the direction of flow of power of the like, power conversion device 30 which is responsible for voltage control can be switched while it is in operation. For example, each power conversion device 30 can selectively perform either voltage control or current control in response to an instruction issued from a host controller (not shown).

Hereinafter, it is assumed that power conversion device 30b controls the DC voltage on DC line 60, while power conversion device 30a controls a DC current (or DC power) flowing between DC line 60 and AC system 10b. That is, in the DC power transmission system, power conversion device 30b corresponds to an embodiment of a "first power conversion device" that is responsible for voltage control, and power conversion device 30a corresponds to an embodiment of a "second power conversion device" that performs current control.

Figure 2:
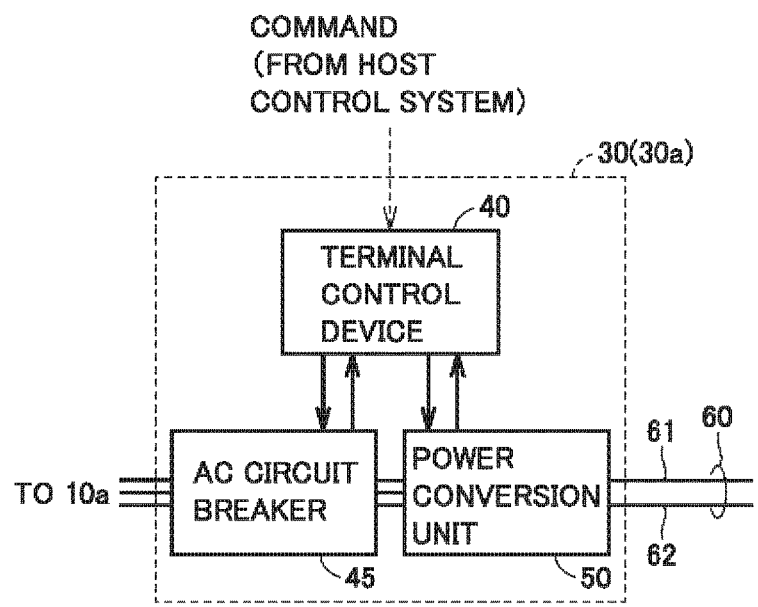
FIG. 2 is a schematic block diagram showing a configuration of the power conversion device shown in FIG. 1.

FIG. 2 is a schematic block diagram showing a configuration of the power conversion device shown in FIG. 1. In the following, while a configuration of power conversion device 30a that performs current control will be mainly described, power conversion device 30b responsible for voltage control can also be configured to be similar to power conversion device 30a.

With reference to FIG. 2, power conversion device 30a includes a terminal control device 40, an AC circuit breaker 45 for interrupting an AC current, and a power conversion unit 50 which performs bidirectional AC/DC power conversion. Power conversion unit 50 is configurable by a known MMC, and a detailed exemplary configuration thereof will be described later.

Terminal control device 40 controls opening and closing of AC circuit breaker 45 and an operation of power conversion unit 50 in response to a command received from a host controller (not shown), a signal detected by and received from each detector described later, or the like. Terminal control device 40 is configurable for example by a microcomputer or the like. As an example, terminal control device 40 incorporates a memory (not shown) and a CPU (a control processing unit) (not shown), and can perform a control operation, as will be described below, by software-processing by the CPU executing a program stored in the memory in advance. Alternatively, the control operation may partially or entirely be implemented by hardware-processing using a built-in dedicated electronic circuit or the like instead of software-processing.

AC circuit breaker 45 is connected between AC system 10a and power conversion unit 50. AC circuit breaker 45 is opened or closed in response to a command issued from terminal control device 40. By opening AC circuit breaker 45, power conversion unit 50 is disconnected from AC system 10a. As a result, a current flowing between AC system 10a and DC line 60 via power conversion unit 50 can be interrupted. That is, AC circuit breaker 45 corresponds to an embodiment of a "current breaker."

While each AC system 10 may handle either single-phase or multi-phase AC power, in the present specification, each AC system 10 including AC system 10a handles three-phase AC power for the sake of illustration. Accordingly, when AC circuit breaker 45 is closed, power conversion unit 50 selectively performs power conversion in which three-phase AC power received from AC system 10a is converted to DC power and transmitted to DC line 60 or power conversion in which DC power received from DC line 60 is converted to AC power and transmitted to AC system 10b.

Note that while power conversion device 30b responsible for voltage control may have a configuration different from that of power conversion device 30b that performs current control, hereinafter, in the present specification, for the sake of simplicity, power conversion devices 30a and 30b, that is, power conversion devices 30s are similarly configured for the sake of illustration. This helps to accommodate switching between voltage control and current control in each power conversion device 30 in response to an instruction received from a host controller or the like, as has been discussed above.

A configuration of power conversion unit 50 will now be described in detail.

Figure 3:
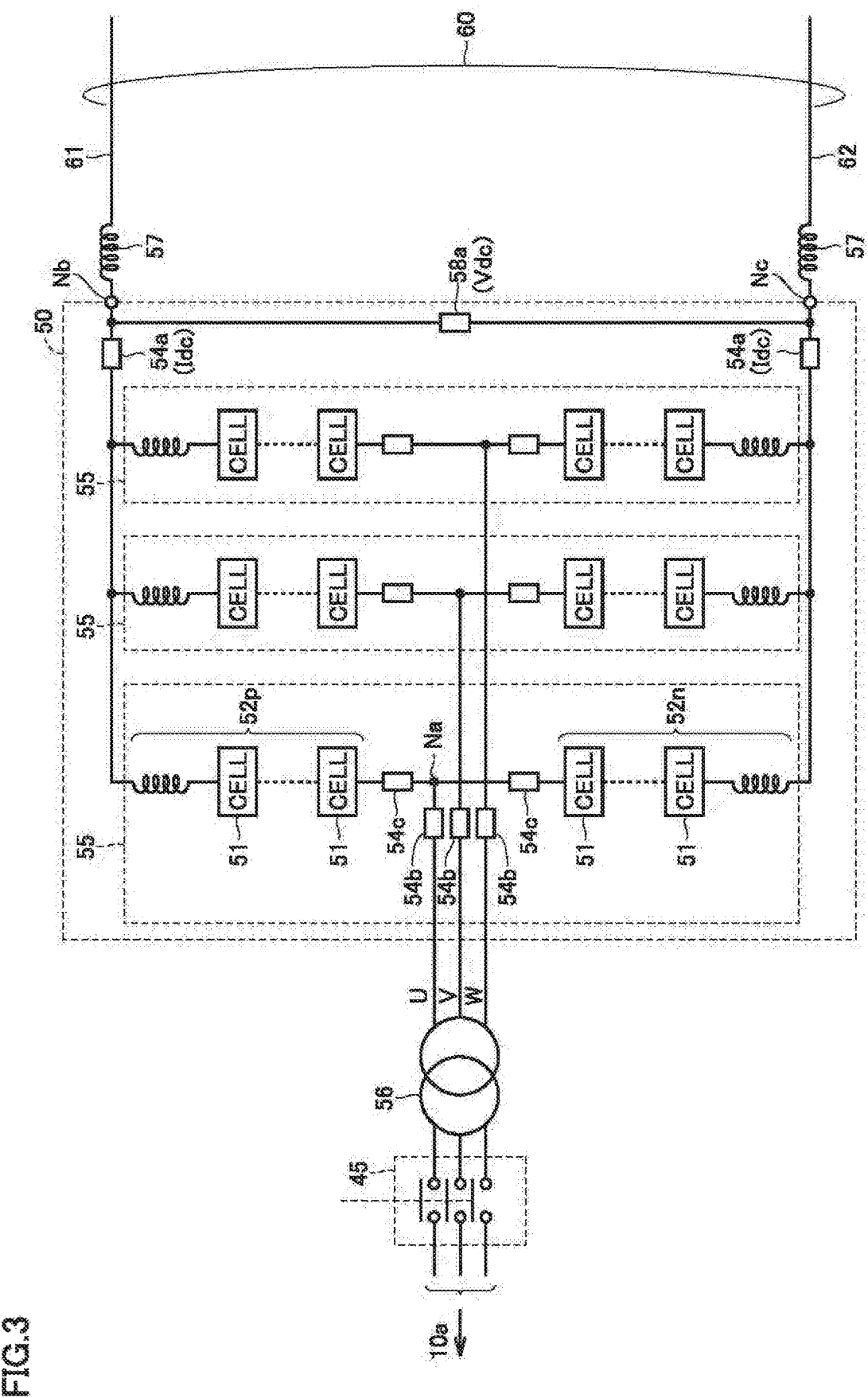
FIG. 3 is a block diagram for illustrating a configuration of a power conversion device according to a first embodiment.

FIG. 3 is a block diagram for illustrating a configuration of a power conversion device according to the first embodiment. FIG. 3 mainly shows a configuration of power conversion unit 50 in detail.

Referring to FIG. 3, power conversion unit 50 includes AC terminals Na and DC terminals Nb and Nc. In the example of FIG. 3, each phase (U, V, W phases) is provided with AC terminal Na in order to correspond to a three-phase AC current. DC terminals Nb and Nc are electrically connected to power lines 61 and 62, respectively, forming DC line 60. An interconnecting reactor 57 can be connected between each of DC terminals Nb and Nc and each of power lines 61 and 62.

AC terminal Na of each phase (U, V, W phases) is electrically connected to each phase (U, V, W phases) of AC system 10a. In the example of FIG. 3, AC terminals Na and AC system 10a (each phase) are electrically connected via AC circuit breaker 45 and a transformer (three-phase) 56. Alternatively, in the electrical connection between AC terminals Na and AC system 10a, it is possible to connect a reactor for interconnection in place of transformer 56, or it is possible to connect both of them in combination. In the present disclosure, being "electrically connected" indicates a state of connection in which electrical energy can be transmitted by direct connection or connection through another element.

Power conversion unit 50 further has a leg circuit 55 corresponding to each phase of AC system 10a. In the exemplary configuration of FIG. 3, three leg circuits 55s are arranged to correspond to a three-phase AC current. Leg circuit 55 of each phase is identical in configuration, and accordingly, in FIG. 3, a configuration of a U-phase leg circuit 55 will be described.

Leg circuit 55 has a positive arm 52p connected in series between DC terminal Nb and AC terminal Na and a negative arm 52n connected between AC terminal Na and DC terminal Nc. Positive arm 52p and negative arm 52n each have a plurality of converter cells 51 (hereinafter also simply referred to as "cells") connected in series. Furthermore, it is also possible to connect a reactor in series with the plurality of cells 51.

Leg circuit 55 of each phase is connected in parallel between power lines 61 and 62. Further, leg circuit 55 of each phase has a connection point connected to AC terminal Na connected to the corresponding phase of AC system 10a. In each leg circuit 55, a current detector 54c is disposed for detecting a current passing through positive arm 52p and negative arm 52n (an arm current Iarm).

Furthermore, in association with AC terminal Na of each phase, a current detector 54b can be disposed for detecting a current passing between AC terminal Na of each phase and AC system 10 (an AC current Iac). Furthermore, in association with DC terminals Nb and Nc, a current detector 54a can be disposed for detecting a current passing between DC terminals Nb and Nc and DC line 60, respectively (a DC current Idc).

DC current Idc and AC current Iac can also be determined by a calculation using arm current Iarm, and it is also possible to dispense with current detectors 54a and 54b by current detector 54c. That is, in the present embodiment, DC current Idc and AC current Iac may be directly measured by a current detector or may be calculated.

Furthermore, a voltage detector 58a is further disposed for detecting DC voltage Vdc between DC terminals Nb and Nc. DC voltage Vdc corresponds to a DC voltage transmitted by DC line 60. Values detected by these current detectors 54b to 54c and voltage detector 58a are input to terminal control device 40 (see FIG. 2).

While FIG. 3 shows an exemplary configuration in which a connection point between positive arm 52p and negative arm 52n is AC terminal Na, the arrangement of the plurality of cells 51 is not limited to such a configuration. For example, leg circuit 55 of each phase may have positive arm 52p and negative arm 52n connected in series and connected to each phase (U, V, W) of AC system 10a via transformer 56. That is, the plurality of cells 51 in each phase have an electrical connection point with AC system 10a via AC circuit breaker 45 and are also connected between DC terminals Nb and Nc (that is, power lines 61 and 62) in series.

In FIG. 3, DC terminal Nb corresponds to a "first DC terminal" and DC terminal Nc corresponds to a "second DC terminal." DC voltage Vdc detected by voltage detector 58a corresponds to a "DC terminal voltage." Further, DC current Idc and AC current Iac can be obtained as values detected by current detectors 54a and 54b or values calculated from a value detected by current detector 54c.

Hereinafter, an exemplary configuration of cell 51 shown in FIG. 3 will be described with reference to FIGS. 4 to 7.

Figure 4:
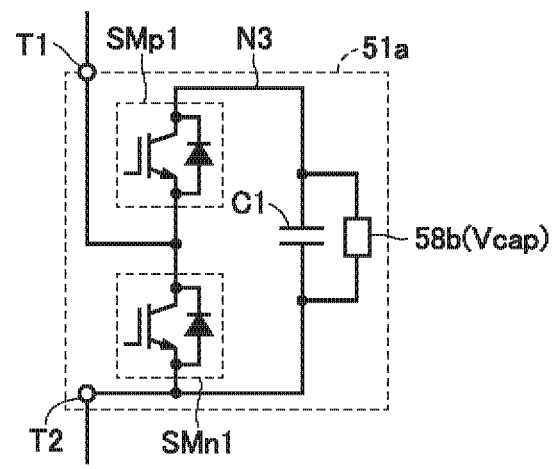
FIG. 4 is a circuit diagram showing a first exemplary configuration of a cell shown in FIG. 3.

Referring to FIG. 4, a cell 51a according to a first exemplary configuration has a so-called half bridge configuration. Specifically, cell 51a has a pair of output terminals T1 and T2, a capacitor C1, and semiconductor switching elements SMp1 and SMn1. Output terminals T1 and T2 are electrically connected to output terminals T1 and T2 of another cell 51, AC terminal Na, or DC terminals Nb and Nc for the serial connection shown in FIG. 3.

Capacitor C1 is connected between a node N3 and output terminal T1, semiconductor switching element SMp1 is connected between output terminal T1 and node N3, and semiconductor switching element SMn1 is connected between output terminals T1 and T2. In cell 51a, a voltage detector 58b is disposed for detecting an inter-terminal voltage of capacitor C1 (hereinafter also simply referred to as a "capacitor voltage Vcap").

Thus, capacitor C1 is connected between output terminals T1 and T2 via semiconductor switching element SMp1. Cell 51a can set an output voltage between output terminals T1 and T2 to +Vcap or 0 through turning on and off (or a switching operation of) semiconductor switching elements SMp1 and SMn1.

Figure 5:
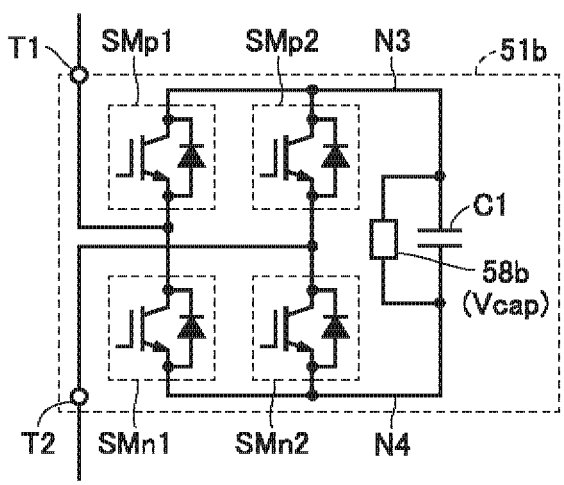
FIG. 5 is a circuit diagram showing a second exemplary configuration of the cell shown in FIG. 3.

Referring to FIG. 5, a cell 51b according to a second exemplary configuration has a so-called full bridge configuration. Specifically, cell 51b has output terminals T1, T2, capacitor C1, and semiconductor switching elements SMp1, SMp2, SMn1, SMn2.

Capacitor C1 is connected between nodes N3 and N4. Voltage detector 58b is disposed for capacitor C1. Semiconductor switching element SMp1 is connected between node N3 and output terminal T1. Semiconductor switching element SMp2 is connected between node N3 and output terminal T2. Similarly, semiconductor switching element SMn1 is connected between node N4 and output terminal T1. Semiconductor switching element SMn2 is connected between node N4 and output terminal T2.

Cell 51b can switch an output voltage between output terminals T1 and T2 among +Vcap, 0, and −Vcap in response to a switching operation of semiconductor switching elements SMp1, SMp2, SMn1, and SMn2.

Figure 6:
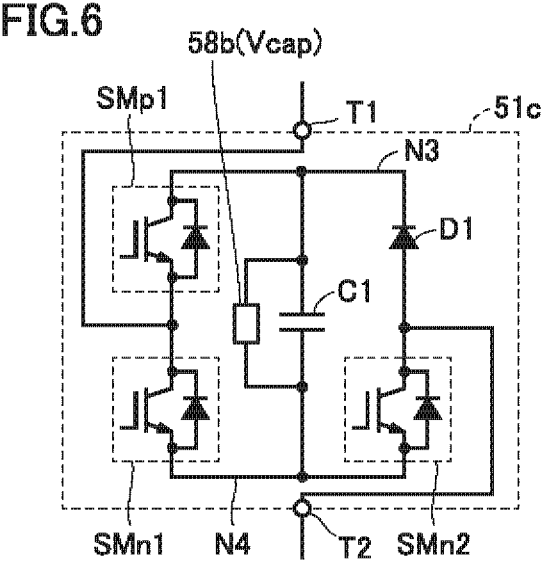
FIG. 6 is a circuit diagram showing a third exemplary configuration of the cell shown in FIG. 3.

Referring to FIG. 6, a cell 51c according to a third exemplary configuration differs from cell 51b shown in FIG. 5 in that semiconductor switching element SMp2 connected between node N3 and output terminal T2 is replaced with a diode D1. Diode D1 is connected with a direction of a current from output terminal T2 to node N3 as a forward direction. The remainder in configuration of cell 51c is the same as that of cell 51b.

Cell 51c outputs a voltage, which can be set to +Vcap or 0 in response to a switching operation of semiconductor switching elements SMp1, SMn1. Further, when a current flows in a direction from output terminal T2 toward output terminal T1, cell 51c can output −Vcap between output terminals T1 and T2 by turning off semiconductor switching elements SMp1 and SMn2.

Figure 7:
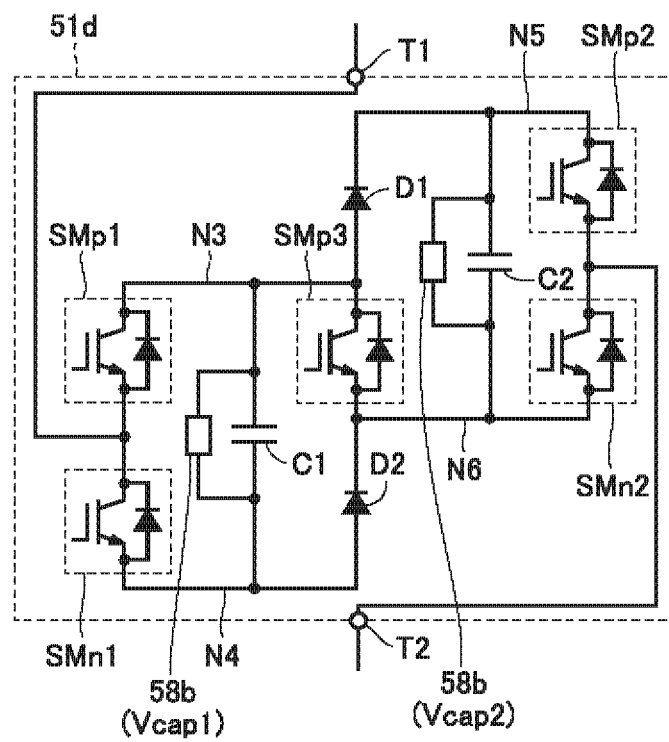
FIG. 7 is a circuit diagram showing a fourth exemplary configuration of the cell shown in FIG. 3.

Referring to FIG. 7, a cell 51d according to a fourth exemplary configuration has a configuration called a so-called double clamp cell. Cell 51d has output terminals T1 and T2, capacitors C1 and C2, semiconductor switching elements SMp1, SMp2, SMp3, SMn1 and SMn2, and diodes D1 and D2.

Capacitor C1 is connected between nodes N3 and N4. Semiconductor switching element SMp1 is connected between output terminal T1 and node N3. Semiconductor switching element SMn1 is connected between output terminal T1 and node N4. Semiconductor switching element SMp3 is connected between nodes N6 and N3. Diode D1 is connected between nodes N3 and N5 with a direction of a current from node N3 to node N5 as a forward direction.

Capacitor C2 is connected between nodes N5 and N6. Semiconductor switching element SMp2 is connected between node N5 and output terminal T2. Semiconductor switching element SMn2 is connected between node N6 and output terminal T2. Diode D2 is connected between nodes N4 and N6 with a direction of a current from node N4 to node N6 as a forward direction. In cell 51d, voltage detector 58b is disposed to correspond to both capacitors C1 and C2.

Cell 51d can output Vcap(1), Vcap(2), −Vcap(1), −Vcap(2), or 0 (zero voltage) between output terminals T1 and T2 by a switching operation of semiconductor switching elements SMp1, SMp2, SMp3, SMn1 and SMn2. Note that capacitor voltages Vcap(1) and Vcap(2) are an inter-terminal voltage of capacitor C1 and that of capacitor C2. In the following description, however, when there is no need to specifically distinguish between capacitor voltages Vcap(1) and Vcap(2), they are also collectively referred to as capacitor voltage Vcap.

Further, when a current flows in a direction from output terminal T2 to output terminal T1, cell 51d can output a negative voltage of −(Vcap(1)+Vcap(2)) between output terminals T1 and T2 by switching elements SMp1 and SMn2 turning off.

Across cells 51a to 51d shown in FIGS. 4 to 7, each of semiconductor switching elements SMp1, SMp2, SMp3, SMn1, and SMn2 can be configured by connecting an FWD (freewheeling diode) to any self arc-extinguishing switching element such as an IGBT (Insulated Gate Bipolar Transistor), a GCT (Gate Commutated Turn-off) thyristor or the like in anti-parallel. While in the present embodiment a semiconductor switching element is used as a "switching element" in a converter cell, another switching element (e.g., a mechanical switch) that is controlled by terminal control device 40 to be turned on/off and thus capable of controlling passage and interruption of a current can replace the semiconductor switching element.

Cell 51 shown in FIG. 3 can be configured by any of cells 51a to 51d shown in FIGS. 4 to 7. Further, in FIGS. 4 to 7, capacitors C1 and C2 correspond to an embodiment of a "power storage element." Further, capacitor voltage Vcap detected by voltage detector 58b corresponds to a "voltage of the power storage element."

Figure 8:
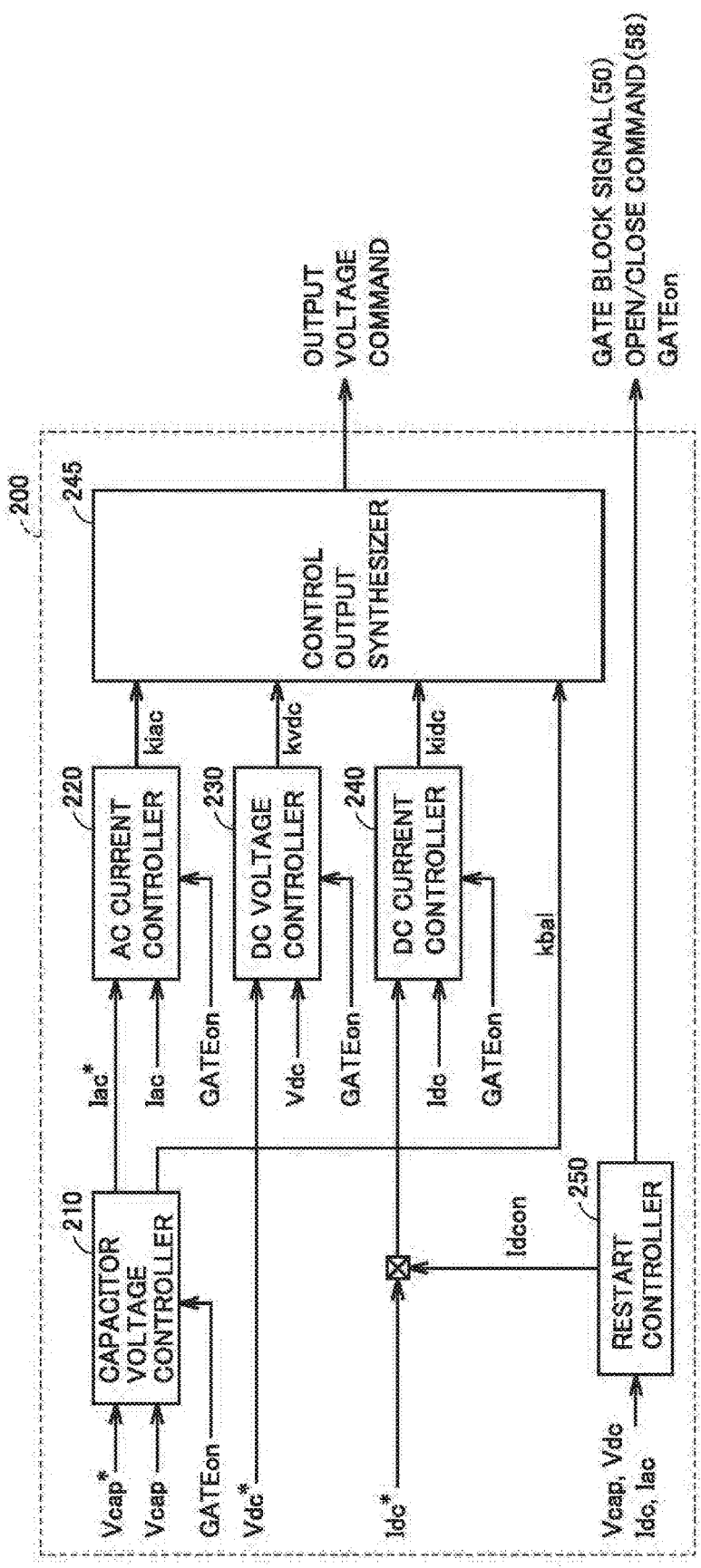
FIG. 8 is a block diagram for illustrating a power conversion control configuration by a terminal control device.

FIG. 8 is a block diagram for illustrating a configuration of controlling power conversion unit 50 by terminal control device 40. Each block shown in FIG. 8 has a function, which can be implemented by software processing by terminal control device 40 and/or hardware processing.

With reference to FIG. 8, a power conversion control system 200 configuring a part of a control function of terminal control device 40 includes a capacitor voltage controller 210, an AC current controller 220, a DC voltage controller 230, a DC current controller 240, a control output synthesizer 245, and a restart controller 250.

Capacitor voltage controller 210 performs a control calculation, based on a value detected by voltage detector 58b disposed in each cell 51, for charging/discharging power to cause capacitor voltage Vcap (Vcap(1), Vcap(2)) of capacitor C1 (C1 and C2) in each cell 51 to follow a capacitor voltage command value Vcap* to generate a voltage balance control command kbal and an AC current command value Iac*.

In power conversion unit 50, capacitor voltage Vcap in each cell 51 varies with balance of power transmitted and received between AC system 10a and DC line 60. Capacitor voltage controller 210 generates AC current command value Iac* for AC current Iac so as to generate a current charged/discharged for matching an average value of detected capacitor voltage Vcap to capacitor voltage command value Vcap*.

AC current controller 220 performs a control calculation for causing AC current Iac flowing into or out of AC terminal Na, as obtained by current detector 54b (see FIG. 3) or through a calculation, to follow AC current command value Iac* issued from capacitor voltage controller 210 to generate an AC current control command kiac.

DC current controller 240 performs a control calculation for causing DC current Idc obtained by current detector 54a or through a calculation to follow DC current command value Idc* to generate a DC current control command kidc.

DC voltage controller 230 performs a control calculation for causing DC voltage Vdc detected by voltage detector 58a to follow DC voltage command value Vdc* to generate a DC voltage control command kvdc.

Each of DC current command value Idc*, DC voltage command value Vdc*, and capacitor voltage command value Vcap* may be input from a host controller (not shown) or predetermined in each terminal control device 40.

In addition, DC current controller 240 receives DC current command value Idc* multiplied by a coefficient Idcon issued from restart controller 250. Therefore, when restart controller 250 sets Idcon=0, DC current command value Idc*=0 is set. Normally, by setting Idcon=1, a value input from the host controller can be maintained and DC current command value Idc* can thus be set.

Further, capacitor voltage controller 210, AC current controller 220, DC voltage controller 230, and DC current controller 240 receive a GATEon signal for controlling turning on/off their respective control operations. For example, when capacitor voltage controller 210 does not receive GATEon signal, that is, when it has its control operation turned off, capacitor voltage controller 210 fixes Iac*=0.

Furthermore, when AC current controller 220 does not receive GATEon signal, that is, when it has its control operation turned off, AC current controller 220 fixes kiac=0. Likewise, when DC voltage controller 230 does not receive GATEon signal, that is, when it has its control operation turned off, DC voltage controller 230 fixes kvdc=const (a constant value), and when DC current controller 240 does not receive GATEon signal, that is, when it has its control operation turned oft DC current controller 240 fixes kidc=0.

In each power conversion device 30, only one of DC voltage controller 230 and DC current controller 240 is turned on while the other is turned off. For example, in power conversion device 30a that performs current control, DC voltage controller 230 is turned off and DC voltage control command kvdc is fixed. On the other hand, in power conversion device 30b responsible for voltage control, DC current controller 240 is turned off and DC current control command kidc=0 is fixed.

Control output synthesizer 245 synthesizes AC current control command kac from AC current controller 220, DC voltage control command kvdc from DC voltage controller 230, DC current control command kidc from DC current controller 240, and voltage balance control command kbal from capacitor voltage controller 210 together to generate an output voltage command for controlling power conversion unit 50.

This output voltage command indicates an AC voltage waveform that positive arm 52p and negative arm 52n should generate between AC terminal Na and each of DC terminals Nb and Nc in each phase. In response to the output voltage command issued from control output synthesizer 245 is generated a gate control signal (not shown) for controlling turning on/off each semiconductor switching element for controlling a voltage output from each cell 51. For example, by applying pulse width modulation (PWM) control, the gate control signal can be generated from the output voltage command indicating the AC voltage waveform.

When each cell 51 has semiconductor switching elements turned on/off in response to the gate control signal, an AC voltage following the output current command is generated in leg circuit 55 of each phase. As a result, power conversion device 30a (current control) can control DC current Idc input to and output from DC line 60 in accordance with DC current command value Idc* while causing capacitor voltage Vcap to follow capacitor voltage command value Vcap*. Similarly, power conversion device 30b (voltage control) can control DC voltage Vdc on DC line 60 in accordance with DC voltage command value Vdc* while causing capacitor voltage Vcap to follow capacitor voltage command value Vcap*.

Restart controller 250 performs stop control in response to detection of an accident on DC line 60 and restart control for power conversion device 30 after such stop. Specifically, restart controller 250 of power conversion device 30a performs stop control and restart control for power conversion device 30a based on DC voltage Vdc, DC current Idc, AC current Iac, and capacitor voltage Vcap of power conversion device 30a. Similarly, restart controller 250 of power conversion device 30b performs stop control and restart control for power conversion device 30b based on DC voltage Vdc, DC current Idc, AC current Iac, and capacitor voltage Vcap of power conversion device 30b. That is, restart controller 250 of each power conversion device 30 operates independently of each other.

For stop control and restart control, restart controller 250 generates a command to open/close AC circuit breaker 45, a gate block signal for fixing the semiconductor switching elements of all of cells 51 of power conversion unit 50 to the off state, and GateON signal for controlling turning on/off each control operation. Furthermore, restart controller 250 further outputs coefficient Idcon for setting DC current command value Idc*=0.

Figure 9:
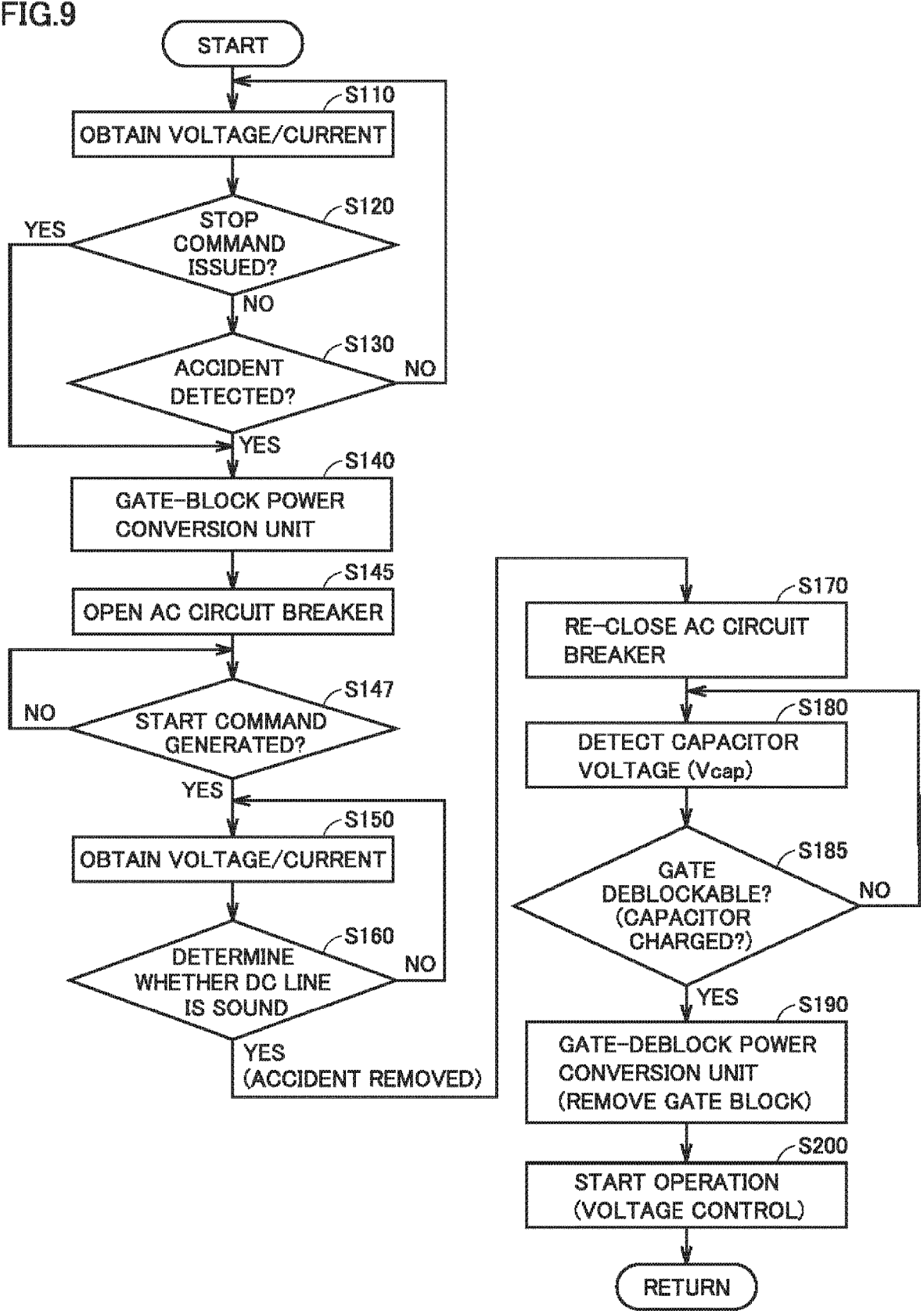
FIG. 9 is a flowchart for illustrating a control process by a restart controller in a power conversion device responsible for voltage control.
Figure 10:
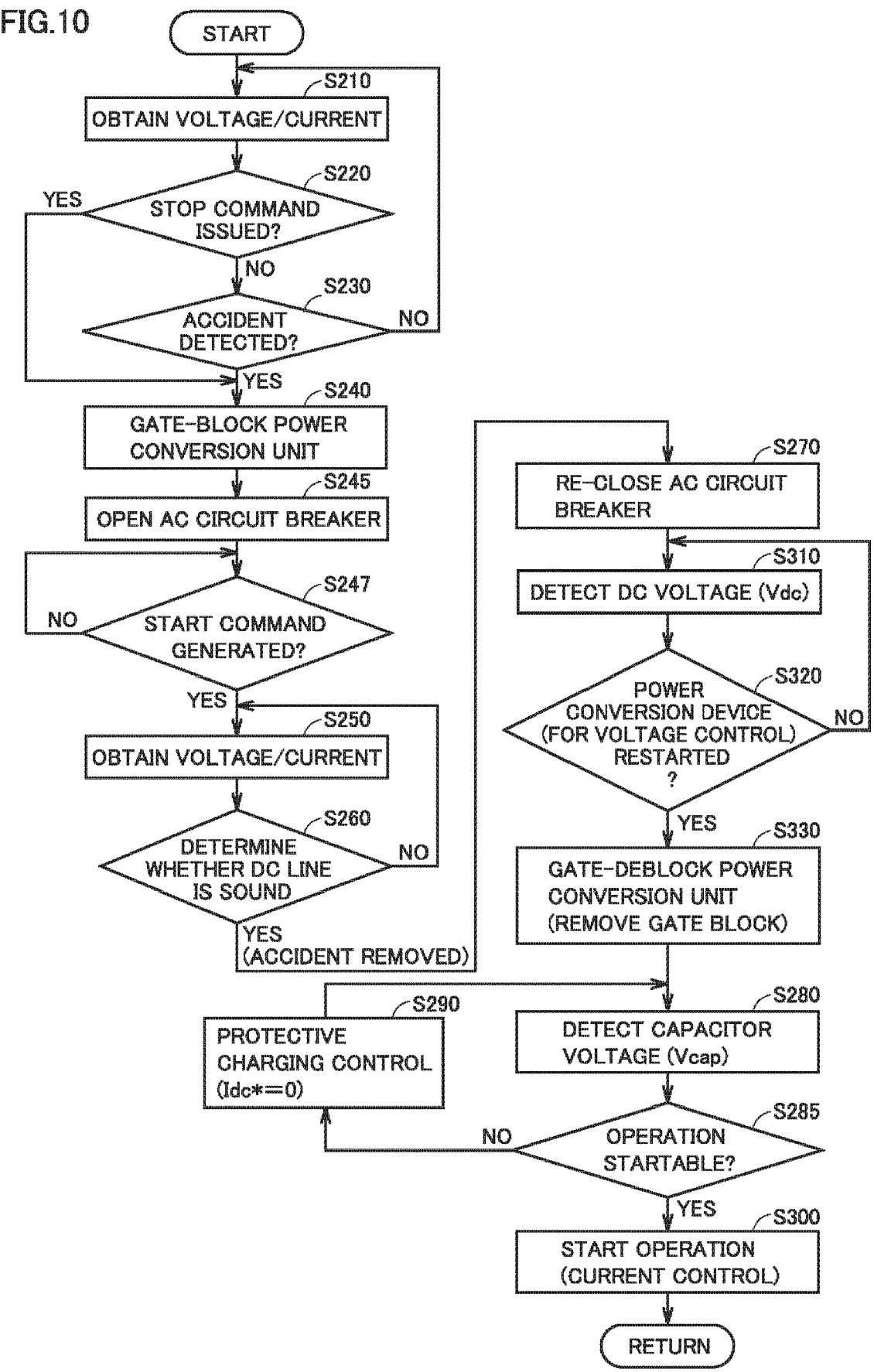
FIG. 10 is a flowchart for illustrating a control process of a restart controller in a power conversion device that performs current control according to the first embodiment.

Further, with reference to FIG. 9 and FIG. 10, stop control and restart control by restart controller 250 will specifically be described. Power conversion device 30 according to the present embodiment operates differently in restart control depending on which one of voltage control or current control is performed.

FIG. 9 is a flowchart for illustrating a control process by the restart controller in power conversion device 30b responsible for voltage control. When terminal control device 40 performs the control process shown in FIG. 9, power conversion device 30b implements a function of restart controller 250 shown in FIG. 8.

Referring to FIG. 9, terminal control device 40 obtains the voltage and current of power conversion device 30b in step S110 in order to detect that DC line 60 has an accident. For example, DC voltage Vdc, DC current Idc, arm current Iarm, and AC current Iac are obtained as values detected by voltage detector 58a and current detectors 54a to 54c or values calculated based on the detected values.

Further, terminal control device 40 in step S120 confirms whether a stop command has been issued from the host controller, and in step S130 uses the voltage and/or current obtained in step S110 to determine whether DC line 60 has an accident.

For example, in step S130, occurrence of an accident is detected when DC current Idc exceeds a predetermined reference value It, that is, when an overcurrent is caused. Alternatively, in order to make determination more reliable, it is also possible to detect occurrence of an accident when DC voltage Vdc is substantially 0 and DC current Idc exceeds reference value It. When occurrence of an accident is detected, a determination of YES is made in step S130. Alternatively, occurrence of an accident can also be detected when AC current Iac exceeds a predetermined reference value.

When at least one of steps S120 and S130 is determined to be YES, terminal control device 40 proceeds to steps S140 and S145. In step S140, a gate block signal is generated for power conversion unit 50. While the gate block signal is generated, power conversion unit 50 has all cells 51 with each semiconductor switching element fixed to the off state (i.e., a gate blocked state). For example, steps S130 and S140 can be performed so that power conversion unit 50 is set in the gate blocked state when an overcurrent occurs (i.e., Idc>It) on DC line 60.

Further, in step S145, a command is generated to open AC circuit breaker 45. This opens AC circuit breaker 45, and power conversion unit 50 is disconnect from AC system 10b. For example, steps S130 and S145 can be performed so that AC circuit breaker 45 is opened when a DC current or an AC current exceeds a reference value.

Through steps S140 and S145, power conversion device 30b transitions from an operational state to a stopped state. Steps S140 and S145 may be performed in parallel. In the stopped state, in each cell 51, charging and discharging capacitor C1 (and C2) is stopped and the output voltage is zeroed.

While a determination of NO is made in both steps S120 and S130, that is, during normal operation, steps S110 to S130 are repeatedly performed periodically as prescribed. Thus, by the control process through steps S110 to S145, terminal control device 40 can perform stop control for bringing power conversion device 30b in operation to a stopped state in response to a stop command issued from the host controller or DC line 60 having an accident.

When power conversion device 30b is in the stopped state, terminal control device 40 confirms in step S147 whether a start command is generated from the host controller. Step S147 is paired with step S120 and when power conversion device 30b is brought to the stopped state in response to the stop command issued from the host controller, step S147 is performed for confirming that the stop command is cleared (that is, a start command is generated). When an accident is detected (YES in S130) and accordingly, power conversion device 30b is brought to the stopped state, a determination of YES is made in step S147 since generation of the start command by the host controller has been maintained.

When it is confirmed that the host controller generates the start command (YES in S147), terminal control device 40 performs restart control through step S150 et seq. In step S150, terminal control device 40 obtains at least DC voltage Vdc. Alternatively, similarly as done in step S110, it is also possible to further obtain DC current Idc or the like.

In step S160, terminal control device 40 performs a determination for soundness by using the voltage (and the current) obtained in step S150 to determine whether the accident on DC line 60 has been removed. In a simplest case, when DC voltage Vdc once decreased to substantially 0 as a short circuit accident had occurred has been recovered and exceeds a reference voltage Vt1, it can be determined that the accident has been removed and DC line 60's soundness is ensured, and a determination of YES can be made in step S160.

It should be noted that reference voltage Vt1 can be set to have a margin with respect to a lower limit value of a normal voltage range in which DC line 60 is charged when a short circuit accident is removed. Alternatively, DC voltage Vdc and DC current Idc are combined, and when Vdc>Vt1 and Idc<It (that is, when an overcurrent disappears) a determination of YES can be made in step S160. Reference voltage Vt1 corresponds to a "first reference voltage."

While DC line 60 does not have the accident removed therefrom (NO in S160), terminal control device 40 repeatedly performs steps S150 and S160 periodically as prescribed. That is, while in the stopped state, it is repeatedly determined whether DC line 60's soundness is ensured and a restartable state is established.

When DC line 60's soundness is ensured (YES in S160), terminal control device 40 proceeds to step S170 to generate a command to re-close AC circuit breaker 45. As a result, a "restart operation" is started, and AC power from AC system 10a is supplied to power conversion unit 50. In each leg circuit 55, charging capacitor C1 (and C2) of each cell 51 with AC power from AC system 10b is started.

When charging capacitor C1 (and C2) is started by closing AC circuit breaker 45, terminal control device 40 detects capacitor voltage Vcap by voltage detector 58b in step S180. In step S185, as charging the capacitor is completed, a determination for deblock is performed for determining whether power conversion unit 50 may be released from the gate blocked state.

For example, the determination for deblock can be made by comparing a capacitor voltage Vc for evaluating a level of charging across the plurality of cells 51, based on capacitor voltage Vcap detected in step S185, with a reference voltage Vct. Reference voltage Vct can be set to have a margin with respect to a minimum value for a capacitor voltage at which a rated operation for voltage control can be started. Further, in the present embodiment, capacitor voltage Vc can be an average value, minimum value or value obtained by an arithmetic operation, a statistical process or the like of capacitor voltage Vcap of all cells 51, as appropriate.

When capacitor voltage Vc for evaluating the level of charging across the plurality of cells 51 is higher than reference voltage Vct, terminal control device 40 makes a determination of YES in step S185 and proceeds to step S190. On the other hand, while a determination of NO is made in step S185, steps S180 and S185 are repeatedly performed periodically as prescribed.

In step S190, terminal control device 40 terminates the generation of the gate block signal for power conversion unit 50. Thus, power conversion unit 50 has all cells 51 with each semiconductor switching element released from the off state to which it is fixed (i.e., brought to a gate deblocked state). Thus, each cell 51 can be turned on/off (or perform a switching operation) in response to a gate control signal generated from an output voltage command issued from control output synthesizer 245 shown in FIG. 8.

Further, in step S200, terminal control device 40 starts operation of power conversion device 30b to start voltage control by means of power conversion control system 200 shown in FIG. 8, that is, to start controlling DC voltage Vdc on DC line 60 in response to DC voltage command value Vdc*. This ends the restart control, and a normal operation by AC/DC power conversion between AC system 10b and DC line 60 starts. During the normal operation, stop control through steps S110 to S145 accompanied by monitoring of voltage and/or current is performed.

In this way, power conversion device 30b responsible for voltage control can be shifted to a stopped state in response to DC line 60 having an accident. Furthermore, after power conversion device 30b has shifted to the stopped state when DC line 60 has recovered soundness the restart operation can be autonomously advanced without considering the condition of the other power conversion device (30b).

FIG. 10 is a flowchart for illustrating a control process by the restart controller in power conversion device 30a responsible for current control. By terminal control device 40 performing the control process shown in FIG. 9, power conversion device 30a implements a function of restart controller 250 shown in FIG. 8.

Referring to FIG. 10, terminal control device 40 performs stop control through steps S210 to S245 similar to steps S110 to S145. Through steps S240 and S245, power conversion device 30a transitions from an operational state to a stopped state. Thus, even while power conversion device 30a is in operation, power conversion device 30a can be brought to a stopped state in response to a stop command issued from the host controller or DC line 60 having an accident.

Further, once power conversion device 30a has entered the stopped state, terminal control device 40 in step S247 similar to step S147 (FIG. 9) confirms a start command issued from the host controller and thereafter performs restart control through step S250 et seq. When DC line 60's soundness is ensured through steps S250 to S270 similar to steps S150 to S170 (YES in S260), terminal control device 40 can re-close AC circuit breaker 45 (S270).

However, when voltage control and current control for DC line 60 are started from this state randomly, DC current Idc of a large magnitude flows out with DC line 60 insufficiently charged and accordingly, DC voltage Vdc fluctuates, which may make an operation of DC power transmission system 100 unstable.

On the other hand, if information from power conversion device 30b responsible for voltage control is used to control restart at power conversion device 30a that performs current control, a communication time is required for transmitting and receiving information, which may prevent fast restart.

Accordingly, terminal control device 40 closes AC circuit breaker 45 in response to confirming that DC line 60 is sound, and subsequently, through steps S310 to S330, terminal control device 40 performs without communications a process for estimating a restart condition of power conversion device 30b responsible for voltage control.

Terminal control device 40 in step S310 obtains DC voltage Vdc on DC line 60 from a value detected by voltage detector 58a, and the control proceeds to step S320 to make a determination for whether power conversion device 30b responsible for voltage control is restarted.

For example, when DC voltage Vdc obtained in step S310 is higher than a reference voltage Vt2, it is estimated that power conversion device 30b has already been restarted and is accordingly, in a state where current control can be stably started. That is, a determination of YES is made in step S320, and the control proceeds to step S330. In contrast, while DC voltage Vdc is lower than reference voltage Vt2 and a determination of NO is made in step S310, steps S310 and S320 are repeated periodically as predetermined until power conversion device 30b is restarted and voltage on DC line 60 is raised.

Note that reference voltage Vt2 can be set to have a margin with respect to a lower limit value for a normal voltage range for DC voltage on DC line 60 when power conversion device 30 responsible for voltage control performs a rated operation, as has been described in FIG. 9. Reference voltage Vt2 corresponds to a "second reference voltage."

Terminal control device 40 removes the gate block of power conversion unit 50 in step S330. Thus, power conversion unit 50 has all cells 51 with each semiconductor switching element released from the off state to which it is fixed (i.e., brought to a gate deblocked state). As a result, each cell 51 is in a state allowing each semiconductor switching element to be turned on/off (or perform a switching operation). In this way, power conversion device 30a is released from the stopped state through steps S270 and S330.

Further, terminal control device 40 in steps 280 and S285 determines, based on a state of charge of capacitor C1 (and C2) of each cell 51, whether power conversion device 30a is in a state allowing power conversion device 30a to start current control for DC line 60, that is, an operation for flow of power. As has been described above, charging capacitor C1 (and C2) in each cell 51 is started when AC circuit breaker 45 is closed (S270).

In step S280, as well as in step S180, capacitor voltage Vcap is detected by voltage detector 58b. Further, as well as the determination in step S185 for deblocking, the determination in step S285 of whether operation can be started can be made by comparing capacitor voltage Vc for evaluating a level of charging across the plurality of cells 51 with reference voltage Vct.

That is, when capacitor voltage Vc across the plurality of cells 51 is higher than reference voltage Vct, a determination of YES is made in step S285, and the control proceeds to step S300.

In contrast, while a determination of NO is made in step S285, terminal control device 40 repeatedly performs steps S280 and S285 periodically as prescribed while performing protective charging control in step S290.

After power conversion unit 50 is gate-deblocked, capacitor C1 (and C2) of each cell 51 can be charged through a switching operation of the semiconductor switching elements, that is, via capacitor voltage controller 210 shown in FIG. 8. Accordingly, in the protective charging control in step S290, Idcon=0 is set to prevent flow of power and thus Idc*=0 is fixed, and in that condition, power conversion unit 50 operates in response to AC current command value Iac* for capacitor voltage control. This allows capacitor C1 (and C2) to be charged rapidly.

In step S300, terminal control device 40 starts operation of power conversion device 30a to start current control by means of power conversion control system 200 shown in FIG. 8, that is, controlling DC current Idc on DC line 60 in response to DC current command value Idc*. This ends the restart control and a normal operation starts. In the normal operation, flow of power is caused between AC system 10a and DC line 60 by AC/DC power conversion. During the normal operation of power conversion device 30a, stop control through steps S210 to S245 accompanied by monitoring of voltage and current is performed.

As has been discussed above, when the power conversion device according to the first embodiment is applied to DC power transmission system 100 having a plurality of power conversion devices 30s connected via DC line 60, the power conversion device according to the first embodiment allows a power conversion device that performs current control (30a) to also autonomously proceed with a restart process in recovering from occurrence of an accident, based on DC voltage Vdc at its own end (that is, DC terminals Nb and Nc of power conversion device 30a) without transmitting or receiving information to or from another power conversion devices. Thus, transmission and reception (that is, communication) of information between the plurality of power conversion devices 30s (i.e., between 30a and 30b) can be dispensed with, and before a power conversion device responsible for voltage control starts a rated operation, current control for DC line 60 can be started to prevent DC power transmission system 100 from operating unstably. As a result, a restart from a stopped state can be performed quickly and stably.

Second Embodiment

In the following second to fifth embodiments will be described a modification of the configuration of the power conversion device and a control process by the restart controller of the power conversion device that performs current control in that configuration.

Figure 11:
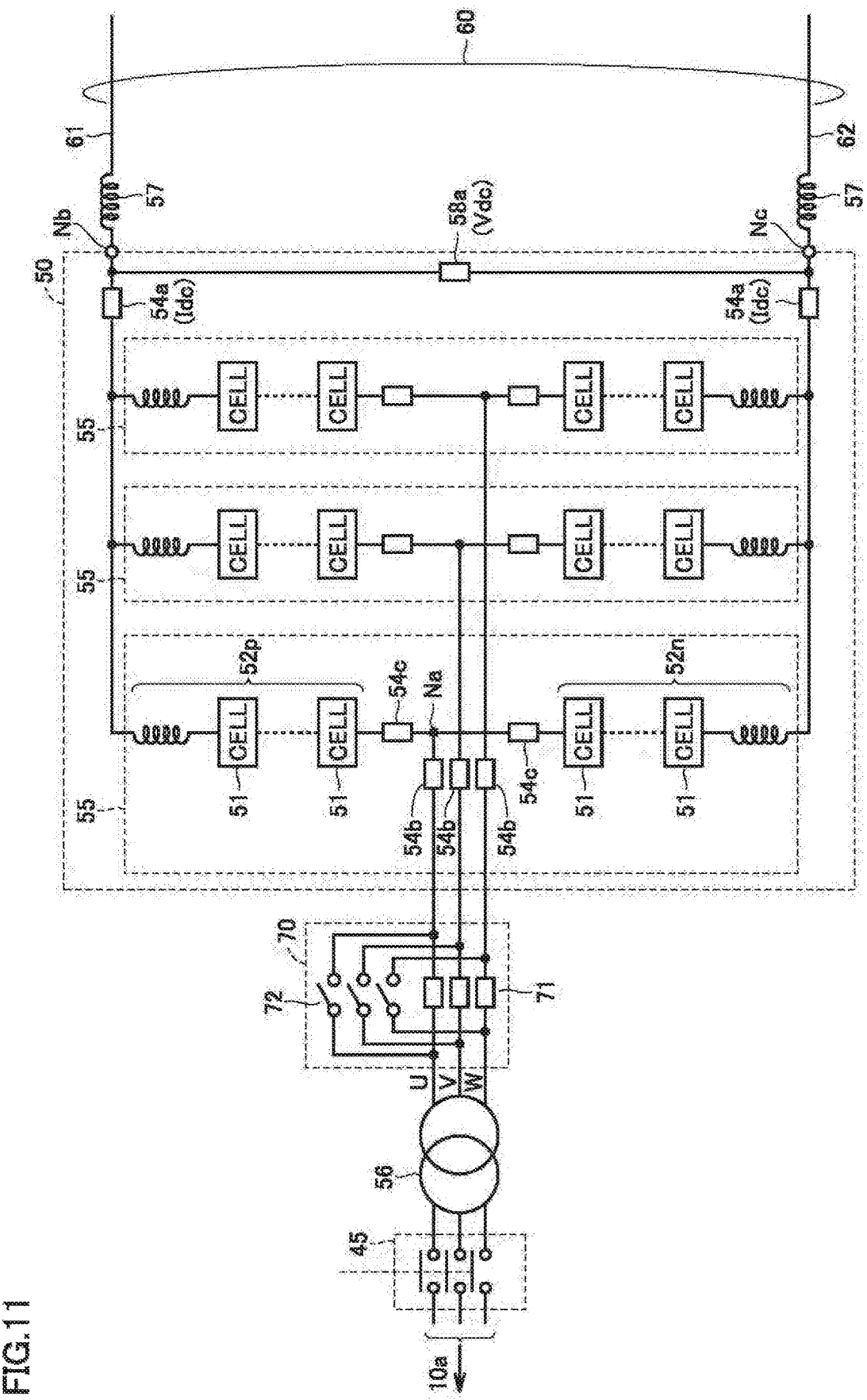
FIG. 11 is a block diagram for illustrating a configuration of the power conversion device according to a second embodiment.

FIG. 11 is a circuit diagram for illustrating a configuration of the power conversion device according to the second embodiment.

With reference to FIG. 11, the power conversion device according to the second embodiment differs from the configuration according to the first embodiment (see FIG. 3) in that the former further comprises a current limiting circuit 70 disposed between AC circuit breaker 45 and AC terminals Na. Current limiting circuit 70 includes a current limiting resistor 71 connected between AC system 10b and AC terminals Na when AC circuit breaker 45 is closed, and a bypass switch 72 for forming a current path bypassing current limiting resistor 71. The remainder in configuration shown in FIG. 11 is the same as that in FIG. 3, and accordingly, will not be described repeatedly.

Bypass switch 72 can be turned on/off as controlled by terminal control device 40 shown in FIG. 2. When bypass switch 72 is turned off, an AC current flows between AC system 10a and power conversion unit 50 (or AC terminals Na) via current limiting resistor 71. In contrast, when bypass switch 72 is turned on, an AC current flows between AC system 10a and power conversion unit 50 (or AC terminals Na) without passing through current limiting resistor 71.

Thus, in the restart control, when bypass switch 72 is turned off, an inrush current caused when capacitor C1 (and C2) has a small amount of charge can be suppressed by current limiting resistor 71. In contrast, when bypass switch 72 is turned on, electric power can be transmitted and received between AC system 10a and power conversion unit 50 without a power loss caused by current limiting resistor 71. It should be noted that current limiting circuit 70 can also be disposed closer to AC system 10a than AC circuit breaker 45.

Figure 12:
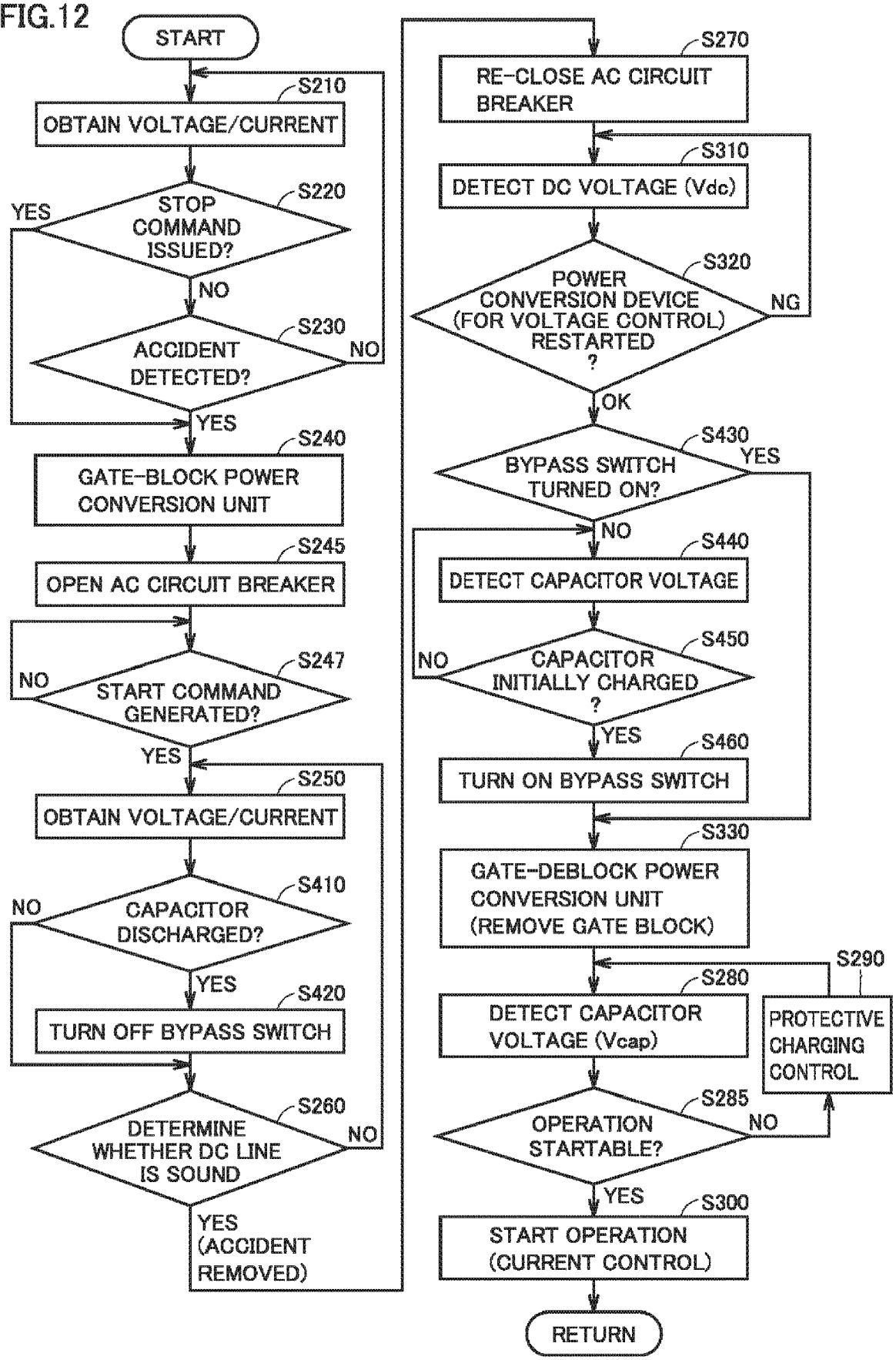
FIG. 12 is a flowchart for illustrating a control process of a restart controller in the power conversion device according to the second embodiment.

FIG. 12 is a flowchart for illustrating a control process of the restart controller in the power conversion device according to the second embodiment. FIG. 12 shows a control process in the power conversion device that performs current control.

Terminal control device 40 performs stop control through steps S210 to S245 similar to FIG. 10. Further, once power conversion device 30a has entered the stopped state, terminal control device 40 in step S247 similar to step S147 (FIG. 9) confirms a start command issued from the host controller and thereafter performs the restart control through step S250 et seq. In doing so, bypass switch 72 is turned on continuously from when normal operation is performed.

In the restart control, together with the FIG. 10 steps S250 and S260 of determining whether DC line 60 is sound, steps S410 and S420 are performed to control turning on/off bypass switch 72.

In step S410, terminal control device 40 determines whether a capacitor is discharged, based on capacitor voltage Vcap detected by voltage detector 58b. For example, when capacitor voltage Vc similar to step S285 is lower than a reference voltage Vdt (i.e., Vc<Vdt), terminal control device 40 determines that capacitor C1 (and C2) is (are) discharged (YES in S410), and can proceed to step S420. In step S420, bypass switch 72 is turned off. In contrast, when capacitor voltage Vc is equal to or higher than reference voltage Vdt, terminal control device 40 makes a determination of NO in step S410 and skips step S320. This holds bypass switch 72 in the on state.

In this manner, at a stage when the soundness of DC line 60 is ensured (YES in S260) and AC circuit breaker 45 is re-closed (S270), bypass switch 72 is turned on or off depending on the then degree of discharging of capacitor C1 (and C2). Thus, when AC circuit breaker 45 is re-closed, a current charged to capacitor C1 (and C2) of low voltage having a large degree of discharging can be suppressed. Note that reference voltage Vdt can be previously determined through an experiment in a real machine or the like considering a relationship between capacitor voltage Vcap and a charging current generated when bypass switch 72 is turned on.

Subsequently, terminal control device 40 performs steps S310 and S320 similar to FIG. 10 to determine whether power conversion device 30b responsible for voltage control is restarted. When DC voltage is increased and accordingly, it is determined that power conversion device 30b has been restarted (YES in S320), steps S430 to S460 are performed to control turning on/off bypass switch 72.

In step S430, terminal control device 40 determines whether bypass switch 72 is turned on. If bypass switch 72 is turned off in step S420 in accordance with a determination of whether a capacitor is discharged, a determination of NO is made in step S430 and the control proceeds to steps S440 to S460.

Terminal control device 40 obtains capacitor voltage Vcap in step S440 and performs step S450 to determine whether the capacitor is initially charged. For example, similarly as done in step S410, whether the capacitor is initially charged can be determined based on comparing capacitor voltage Vc with a reference voltage Vich.

When capacitor voltage Vc for evaluating a level of charging across the plurality of cells 51 is higher than reference voltage Vich, terminal control device 40 determines that initially charging capacitor C1 (and C2) is completed (YES in S450), and proceeds to step S460. In step S460, bypass switch 72 is turned on in response to the completion of the initial charging. While capacitor voltage Vc is lower than reference voltage Vich (NO in S450), bypass switch 72 is held off, and in that condition, charging capacitor C1 (and C2) is continued, and steps S440 and S450 are also repeatedly performed periodically as prescribed.

In contrast, when whether the capacitor is discharged is determined (S410) and accordingly, bypass switch 72 is held on (NO in S410), a determination of YES is made in step S430, and accordingly, steps S440 to S460 are skipped.

Terminal control device 40 removes the gate block of power conversion unit 50 in step S330 with bypass switch 72 turned on. Further, terminal control device 40 performs steps S280 to S300 similar to FIG. 10, and when charging capacitor C1 (and C2) of each cell 51 is completed by power conversion unit 50 gate-deblocked, terminal control device 40 starts operation of power conversion device 30a (or current control).

It should be noted that reference voltage Vich applied in determining whether a capacitor is initially charged is set to be equal to or higher than reference voltage Vdt applied in determining whether the capacitor is discharged. Further, reference voltage Vct applied in determining whether operation is started (S320) is set to be higher than reference voltage Vich and reference voltage Vdt (i.e., Vct>Vich≥Vdt).

Further, in steps S410, S450, and S285 of evaluating a capacitor voltage, capacitor voltage Vc may be obtained through a different calculation process. For example, in step S285 an average value of capacitor voltages Vcap of the plurality of cells 51 can be set to capacitor voltage Vc, whereas in step S410 a minimum value of capacitor voltages Vcap of the plurality of cells 51 can be set to capacitor voltage Vc.

Thus, according to the power conversion device according to the second embodiment, in addition to an effect of the power conversion device according to the first embodiment, even when capacitor C1 (and capacitor C2) in power conversion unit 50 (each cell 51) is discharged during the stopped state, the power conversion device can be restarted without generating an excessive inrush current.

Third Embodiment

Figure 13:
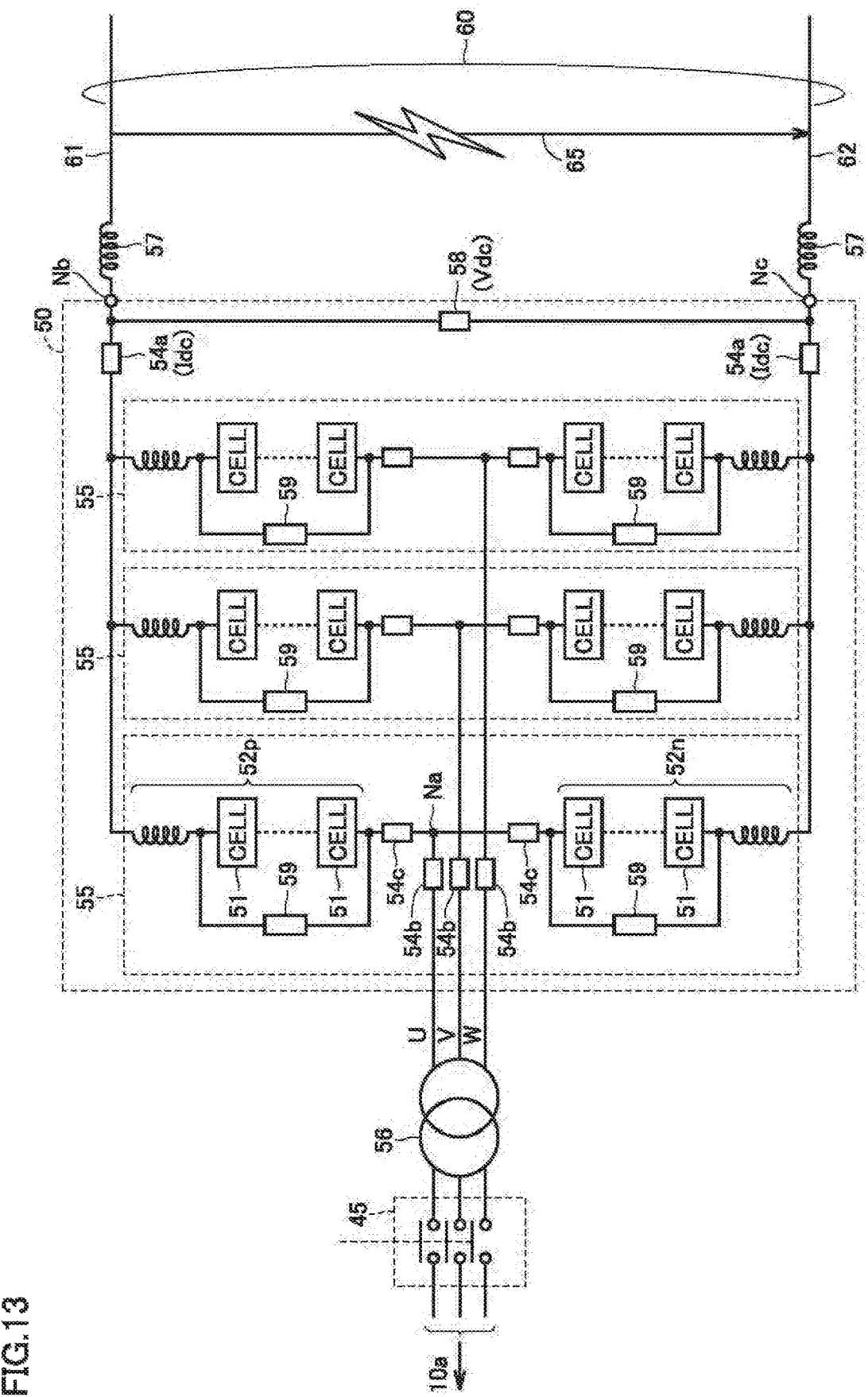
FIG. 13 is a block diagram for illustrating a configuration of the power conversion device according to a third embodiment.

FIG. 13 is a block diagram for illustrating a configuration of a power conversion device according to a third embodiment.

With reference to FIG. 13, the power conversion device according to the third embodiment differs from the configuration of the first embodiment (see FIG. 3) in that power conversion unit 50 has each leg circuit 55 with positive arm 52p and negative arm 52n each provided with an accident current bypass 59.

When a short circuit path 65 is caused in DC line 60, an accident current is generated in a direction from power line 61 toward power line 62. When this accident current flows into power conversion unit 50, a large current may pass and accordingly, cell 51 may fail.

Accordingly, accident current bypass 59 is configured to have a current path for causing a short-circuit current flowing into power conversion unit 50 to circulate by bypassing the plurality of cells 51 in each leg circuit 55. For example, for positive arm 52p, accident current bypass 59 can be composed of a diode connected anti-parallel to a plurality of converter cells 51 with a direction of a current from AC terminal Na to DC terminal Nb as a forward direction. Similarly, for negative arm 52n, accident current bypass 59 can be composed of a diode connected anti-parallel to a plurality of converter cells 51 with a direction of a current from DC terminal Nc to AC terminal Na as a forward direction. Note that normally (or when there is no accident) these diodes are reversely biased by a difference in potential between DC terminals Nb, Nc (or power lines 61, 62) and AC terminal Na, and accordingly, do not form a current path.

Alternatively, accident current bypass 59 is also configurable by a semiconductor relay (not shown), an electromagnetic relay or a mechanical switch, or a semiconductor switching element such as a thyristor turned on/off as controlled by terminal control device 40. In that case, accident current bypass 59 is controlled so that in response to a command received from terminal control device 40 a current path for circulating the short-circuit current is interrupted by default whereas the current path is formed when DC line 60 has an accident.

Figure 14:
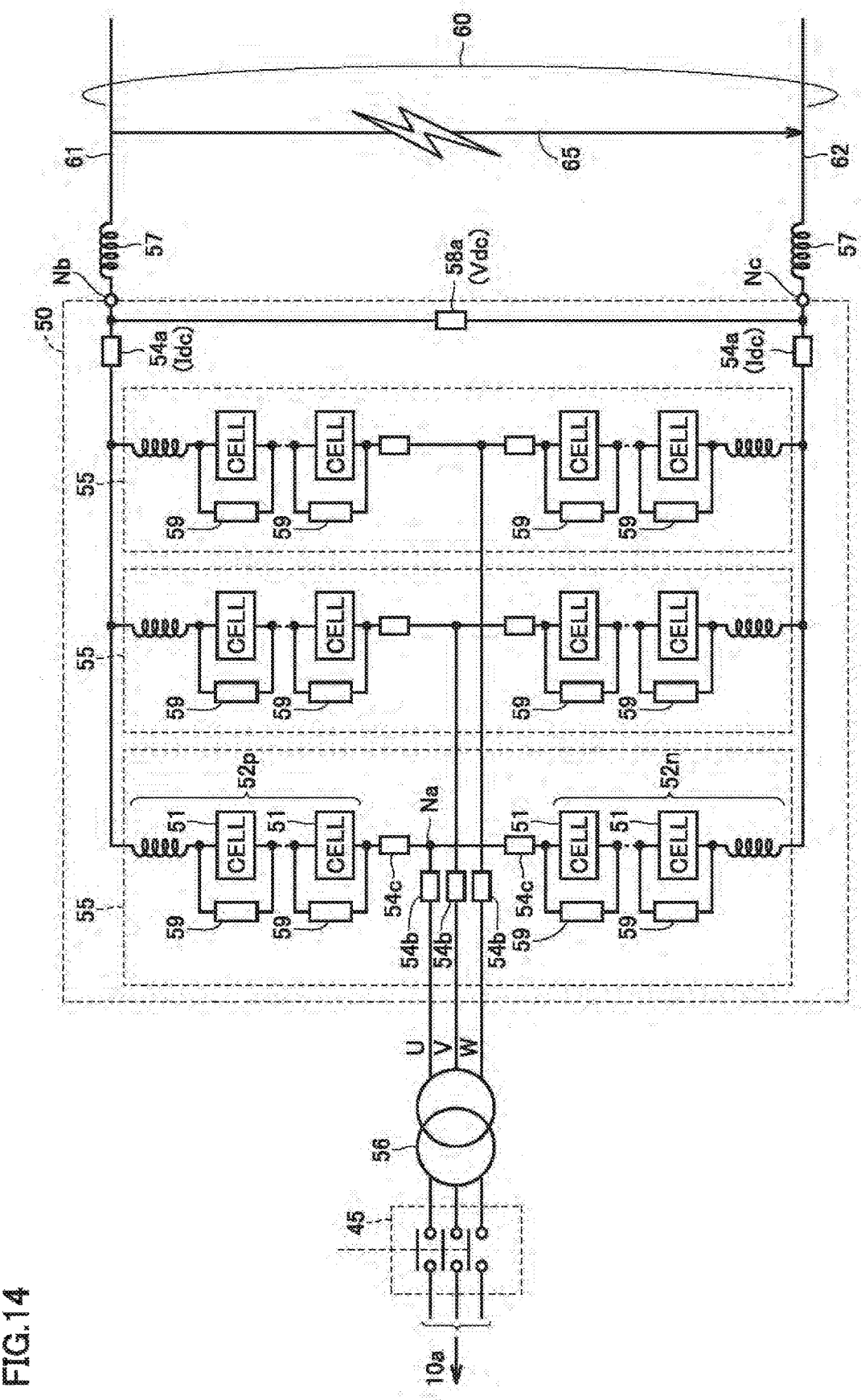
FIG. 14 is a block diagram for illustrating a modified example of the configuration of the power conversion device according to the third embodiment.

Alternatively, as shown in FIG. 14, accident current bypass 59 configurable as described above can also be arranged to correspond to each cell 51. In other words, accident current bypass 59 is arranged in any manner insofar as a path which circulates a short-circuit current that flows into power conversion unit 50 by bypassing the plurality of cells 51 can be ensured between DC terminals Nc and Nb.

Figure 15:
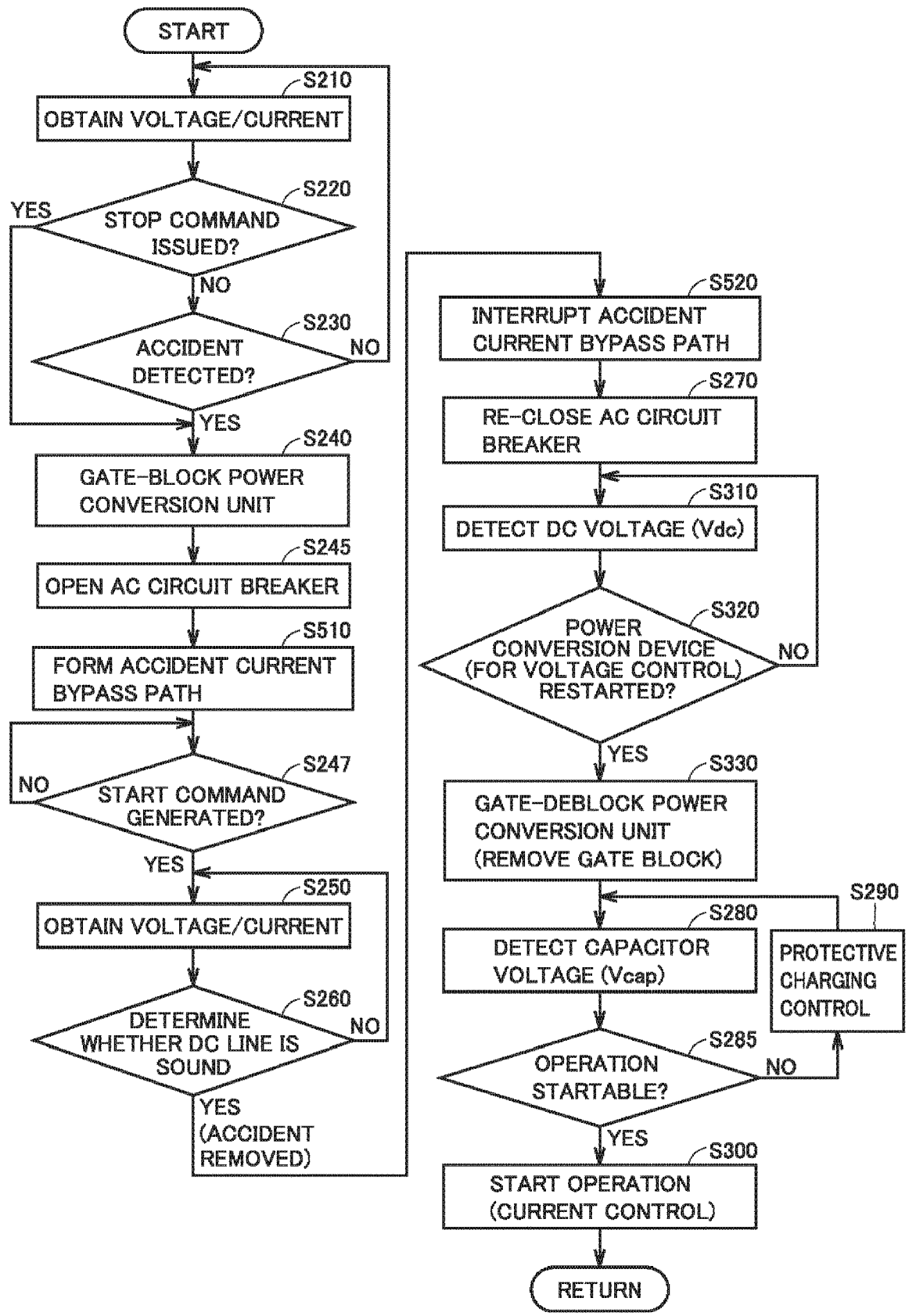
FIG. 15 is a flowchart for illustrating a control process of a restart controller in the power conversion device according to the third embodiment.

FIG. 15 is a flowchart for illustrating a control process of stop control and restart control in the power conversion device according to the third embodiment.

Referring to FIG. 15, in addition to the stop control through steps S210 to S245 similar to FIG. 10, terminal control device 40 outputs a command in step S510 to accident current bypass 59 for forming an accident current bypass path. It should be noted that step S510 can be performed in parallel with step S240 and step S245 in response to a determination of YES made in step S220 or S230.

Terminal control device 40 with an accident current path formed to bypass the plurality of cells 51 performs step S247 to confirm whether a start command is issued from the host controller, and thereafter, terminal control device 40 performs steps S250 to S260 similar to FIG. 10 to determine whether DC line 60 is sound. When that DC line 60 is sound is ensured by eliminating an accident (YES in S260), terminal control device 40 performs step S520 to issue a command to accident current bypass 59 to interrupt the accident current bypass path.

Furthermore, with accident current bypass 59 interrupting a current path, terminal control device 40 performs restart control through step S270 et seq. similar to FIG. 10. Thus, restart control similar to that in the first embodiment is implemented.

Thus, according to the power conversion device according to the third embodiment, in addition to an effect of the power conversion device according to the first embodiment, even when power conversion unit 50 receives an accident current, a device failure can be suppressed by forming a current path which bypasses the plurality of cells 51.

Fourth Embodiment

Figure 16:
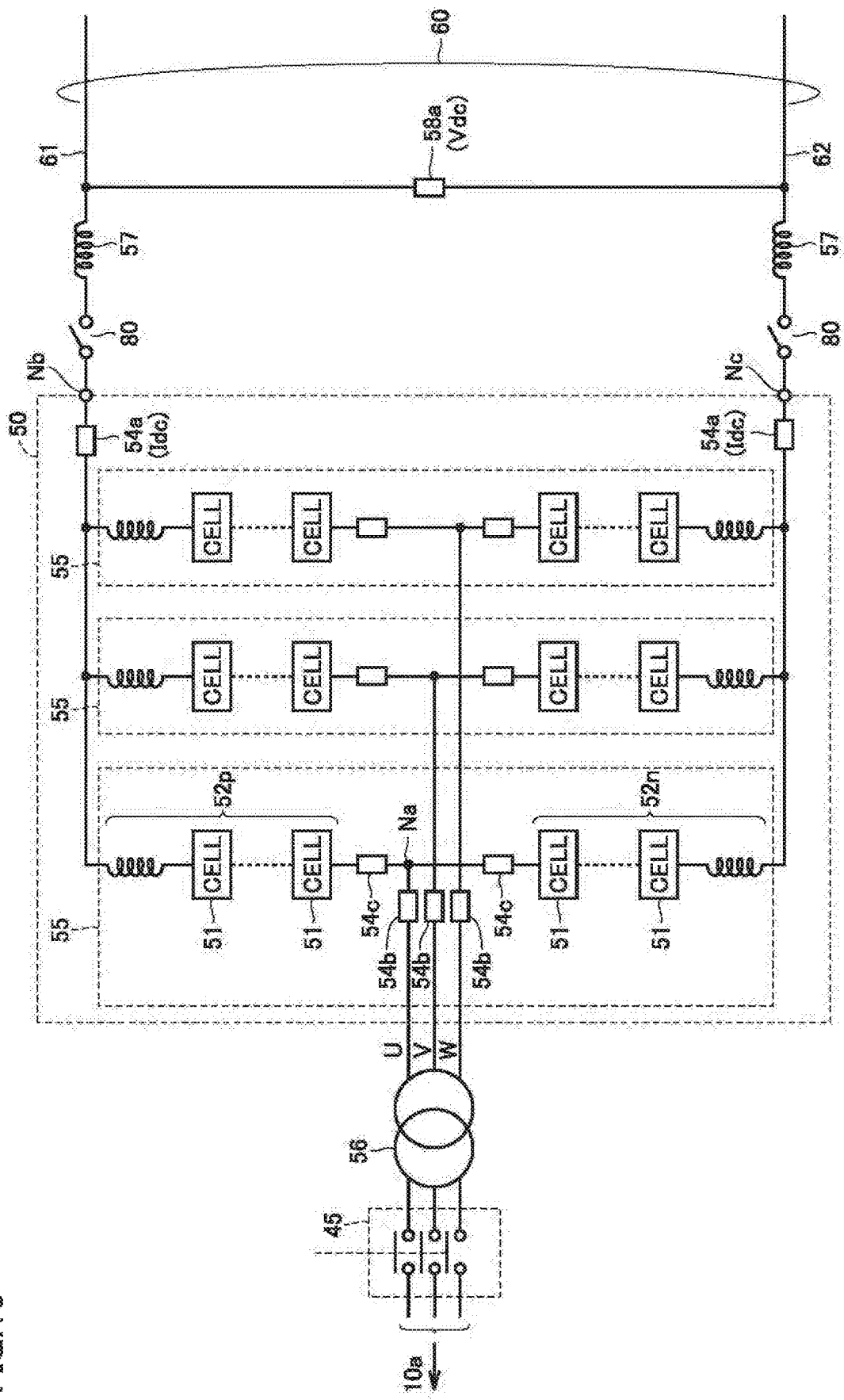
FIG. 16 is a block diagram for illustrating a configuration of the power conversion device according to a fourth embodiment.

FIG. 16 is a block diagram for illustrating a configuration of a power conversion device according to a fourth embodiment.

Referring to FIG. 16, the power conversion device according to the fourth embodiment differs from the configuration according to the first embodiment (see FIG. 3) in that a DC circuit breaker 80 is provided between DC terminal Nb and power line 61 and between DC terminal Nc and power line 62. Further, voltage detector 58a is disposed to detect DC voltage Vdc on a side closer to DC line 60 than DC circuit breaker 80. The remainder in configuration shown in FIG. 16 is the same as that in FIG. 3, and accordingly, will not be described repeatedly.

DC circuit breaker 80 is opened/closed as controlled by terminal control device 40. When terminal control device 40 opens DC circuit breaker 80, power conversion unit 50 can be disconnected from DC line 60. Thus, by opening DC circuit breaker 80, a current flowing between AC system 10a and DC line 60 via power conversion unit 50 can be interrupted. That is, DC circuit breaker 80 also corresponds to an embodiment of the "current breaker." In the exemplary configuration of FIG. 16, AC circuit breaker 45 and DC circuit breaker 80 can disconnect power conversion unit 50 from both AC system 10a and DC line 60.

Figure 17:
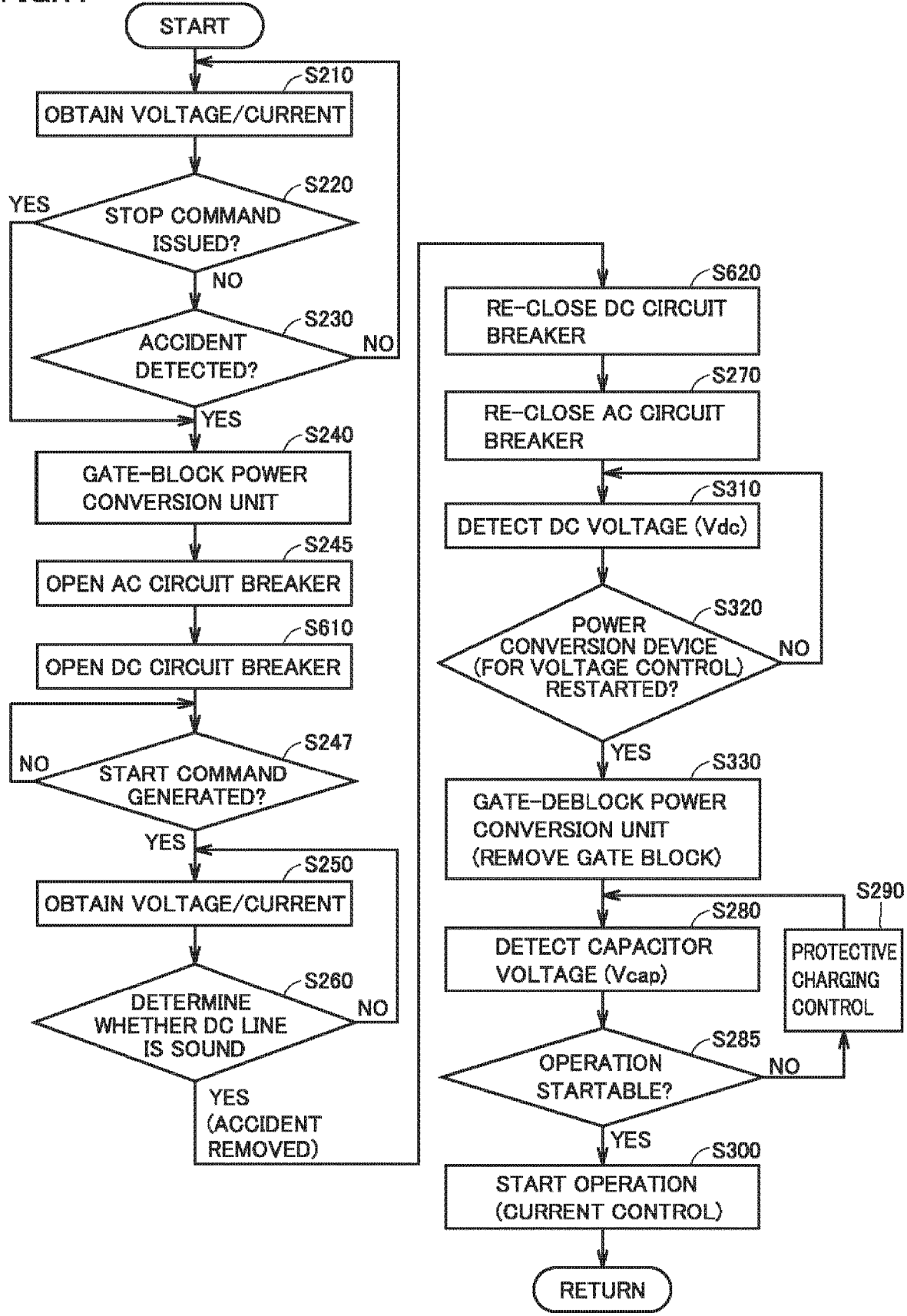
FIG. 17 is a flowchart for illustrating a first example of a control process of a restart controller in the power conversion device according to the fourth embodiment.

FIG. 17 is a flowchart for illustrating a first example of a control process of the restart controller in the power conversion device according to the fourth embodiment.

Referring to FIG. 17, in addition to the stop control through steps S210 to S245 similar to FIG. 10, terminal control device 40 opens DC circuit breaker 80 in step S610. It should be noted that step S610 can be performed in parallel with step S240 (gate-blocking power conversion unit 50) and step S245 (opening AC circuit breaker 45) in response to a determination of YES made in step S220 or S230.

Terminal control device 40 with DC circuit breaker 80 opened performs step S247 to confirm whether a start command is issued from the host controller, and thereafter, terminal control device 40 performs steps S250 to S260 similar to FIG. 10 to determine whether DC line 60 is sound. When that DC line 60 is sound is ensured by eliminating an accident (YES in S260), terminal control device 40 performs step S620 to re-close DC circuit breaker 80. It should be noted that step S620 can be performed in parallel with step S270 (re-closing AC circuit breaker 45) in response to a determination of YES made in step S260.

Furthermore, with DC circuit breaker 80 closed, terminal control device 40 performs restart control through step S270 et seq. similar to FIG. 10. Thus, restart control similar to that in the first embodiment is implemented. Furthermore, by opening DC circuit breaker 80 in response to detection of an accident, power conversion unit 50 can rapidly be disconnected from a path of an accident current.

Figure 18:
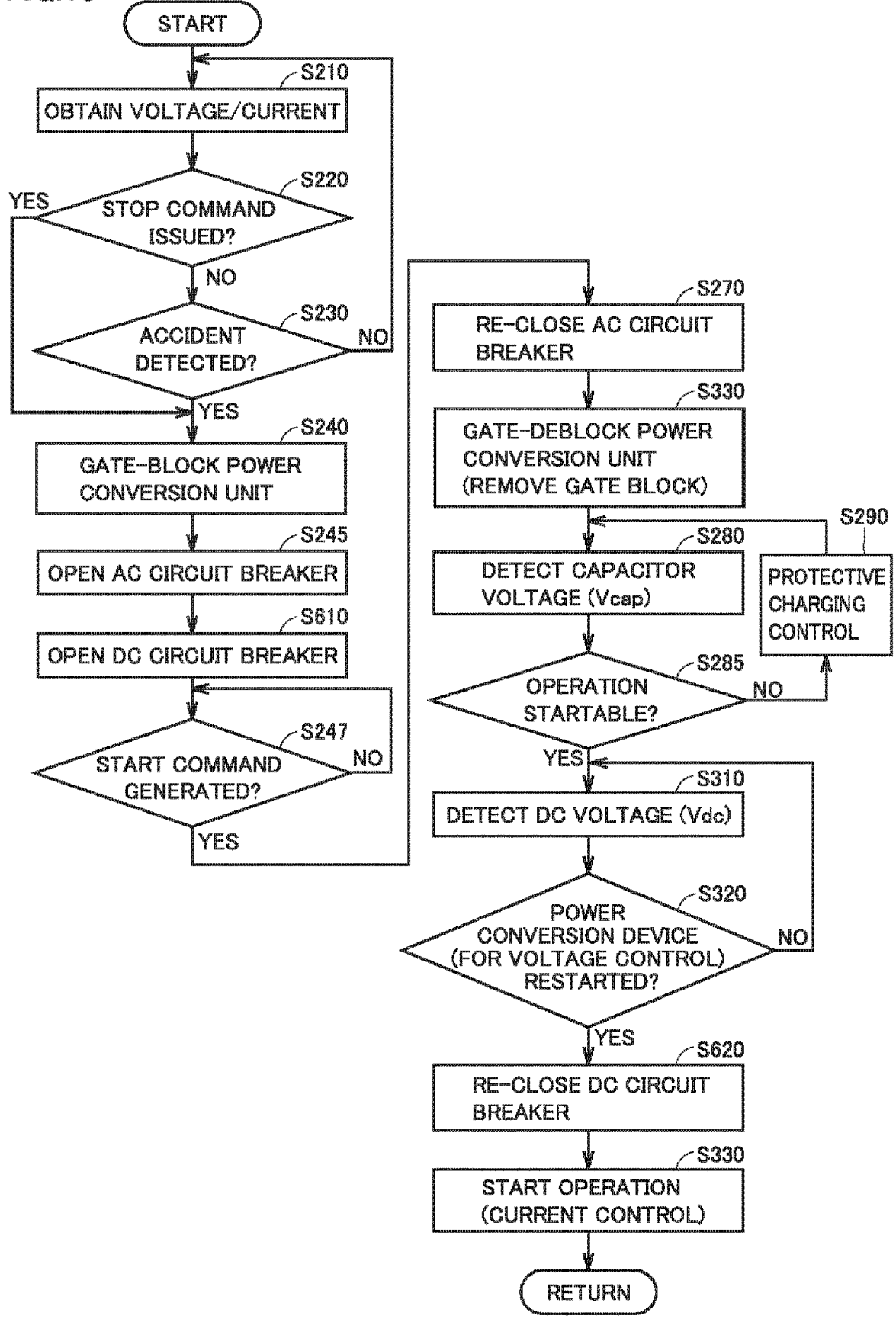
FIG. 18 is a flowchart for illustrating a second example of the control process of the restart controller in the power conversion device according to the fourth embodiment.

FIG. 18 is a flowchart for illustrating a second example of a control process of the restart controller in the power conversion device according to the fourth embodiment.

Comparing FIG. 18 with FIG. 17, the control process according to the second example differs from the first example (see FIG. 17) in when DC circuit breaker 80 once opened is re-closed.

In FIG. 18, a process up to opening DC circuit breaker 80 in step S610 is the same as in FIG. 17. Opening DC circuit breaker 80 allows power conversion device 30a to proceed with a start process regardless of whether DC line 60 is sound. Accordingly, after a start command from the host controller is confirmed in step S247, steps S270 (reclosing AC circuit breaker 45) and S330 (removing gate block of power conversion unit 50) similar to FIG. 10 can be performed.

Further, terminal control device 40 maintains DC circuit breaker 80 in an open state and performs S280 to S290 to charge a capacitor of each cell 51. When the capacitor is completely charged and power conversion device 30a establishes a state ready to start an operation (or AC/DC power conversion) by performing AC/DC power conversion (YES in S285), steps S310 and S320 are performed to determine whether DC line 60 is raised by a rated operation of power conversion device 30 responsible for voltage control.

When it is estimated that power conversion device 30a has established a state ready to start operation and power conversion device 30 responsible for voltage control has started the rated operation (YES in S320), terminal control device 40 performs step S620 to reclose DC circuit breaker 80. And with DC circuit breaker 80 closed, step S300 is performed to start operation of power conversion device 30a to start controlling DC current Idc on DC line 60 in response to DC current command value Idc*. Thus, a normal operation is started and flow of power is caused between AC system 10a and DC line 60 by AC/DC power conversion.

Thus, according to the power conversion device according to the fourth embodiment, in addition to an effect of the power conversion device according to the first embodiment, an accident current caused on DC line 60 can be rapidly interrupted. This can suppress device failure caused in power conversion unit 50 due to an inflow of an accident current.

Furthermore, by controlling the reclosing of DC circuit breaker 80 according to the control process shown in FIG. 18, a restart operation in power conversion device 30a (or charging a capacitor in each cell 51) is advanced regardless of the state of DC line 60, and the restart operation is performed faster effectively.

As a modification of the control process in FIGS. 17 and 18, a configuration in which both AC circuit breaker 45 and DC circuit breaker 80 are disposed as a "current breaker" (see FIG. 16) can dispense with opening AC circuit breaker 45 (S245) and reclosing AC circuit breaker 45 (S275).

Further, in the exemplary configuration of FIG. 16, it is also possible to dispense with AC circuit breaker 45 and dispose DC circuit breaker 80 alone as a "current breaker." With such a configuration, an effect of the power conversion device according to the fourth embodiment can be obtained by the control process in FIGS. 17 and 18 minus steps S245 and S275 as described above.

Fifth Embodiment

Figure 19:
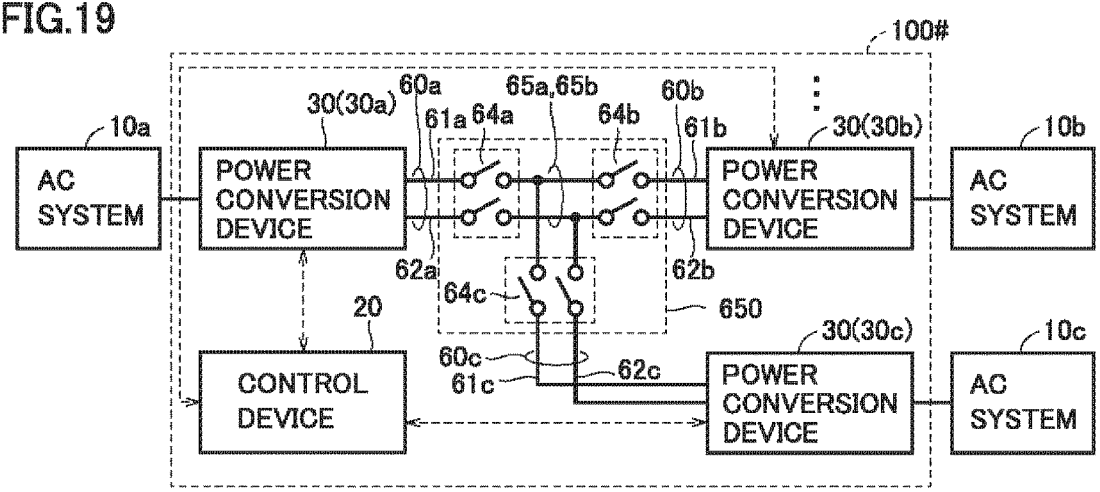
FIG. 19 is a block diagram for illustrating a configuration of a DC power transmission system according to a fifth embodiment.

FIG. 19 is a block diagram for illustrating a configuration of a DC power transmission system according to a fifth embodiment.

Referring to FIG. 19, a DC power transmission system 100# according to the fifth embodiment has a plurality of AC systems 10a to 10c and power conversion devices 30a to 30c connected via DC circuit breakers 64a to 64c.

Power conversion device 30a performs bidirectional AC/DC power conversion between AC system 10a and a DC line 60a composed of power lines 61a and 62a. Similarly, power conversion device 30b performs bidirectional AC/DC power conversion between AC system 10b and a DC line 60b composed of power lines 61b and 62b. Similarly, power conversion device 30c performs bidirectional AC/DC power conversion between AC system 10c and a DC line 60c composed of power lines 61c and 62c.

DC lines 60a to 60c are connected to common power lines 65a and 65b via DC circuit breakers 64a to 64c.

Further, FIG. 19 shows a control device 20 for generally controlling DC power transmission system 100#. As well as terminal control device 40, control device 20 can also be configured to perform prescribed software processing and/or hardware processing by a microcomputer or the like. Control device 20 has a function corresponding to the host controller described in the first to fifth embodiments.

Basically, DC circuit breakers 64a to 64c are opened/closed as controlled by control device 20. Alternatively, each power conversion device 30 may have terminal control device 40 provided with a function to open and close a DC circuit breaker connected to a DC line corresponding thereto. For example, for opening/closing DC circuit breaker 64a, it is also possible to configure terminal control device 40 of power conversion device 30a in addition to control device 20 to open DC circuit breaker 64a when terminal control device 40 detects an accident (S230) or in response to a command from control device 20 (S220).

By DC circuit breakers 64a to 64c, a power line switch 650 can be configured for switching DC lines 60a to 60c interconnected via common power lines 65a and 65b, that is, AC systems 10a to 10c to be interconnected.

When DC lines 60a to 60c are all normal, DC circuit breakers 64a to 64c are closed, respectively. In this state, one of power conversion devices 30a to 30c operates as a power conversion device responsible for voltage control in response to a command issued from control device 20. The remaining power conversion devices 30s perform current control.

When from such a normal state, on any of DC lines 60a to 60c, rather than a temporary accident attributed to a lightening strike or the like, an accident attributed to a degraded cable, line or the like and accordingly, continuous and requiring a restoration work (hereinafter also referred to as a "permanent accident") has occurred, control device 20 controls power line switch 650 to disconnect a power system involving the permanent failure from the other power systems. Specifically, DC line 60 having the permanent failure is disconnected from power lines 65a and 65b, and DC power transmission can be resumed by using the remaining normal power systems.

In doing so, when a power system corresponding to a power conversion device responsible for voltage control has a permanent failure, control device 20 can designate a different power conversion device to be responsible for voltage control. Thus, according to the first to fifth embodiments, each power conversion device 30 can be rapidly restarted.

Figure 20:
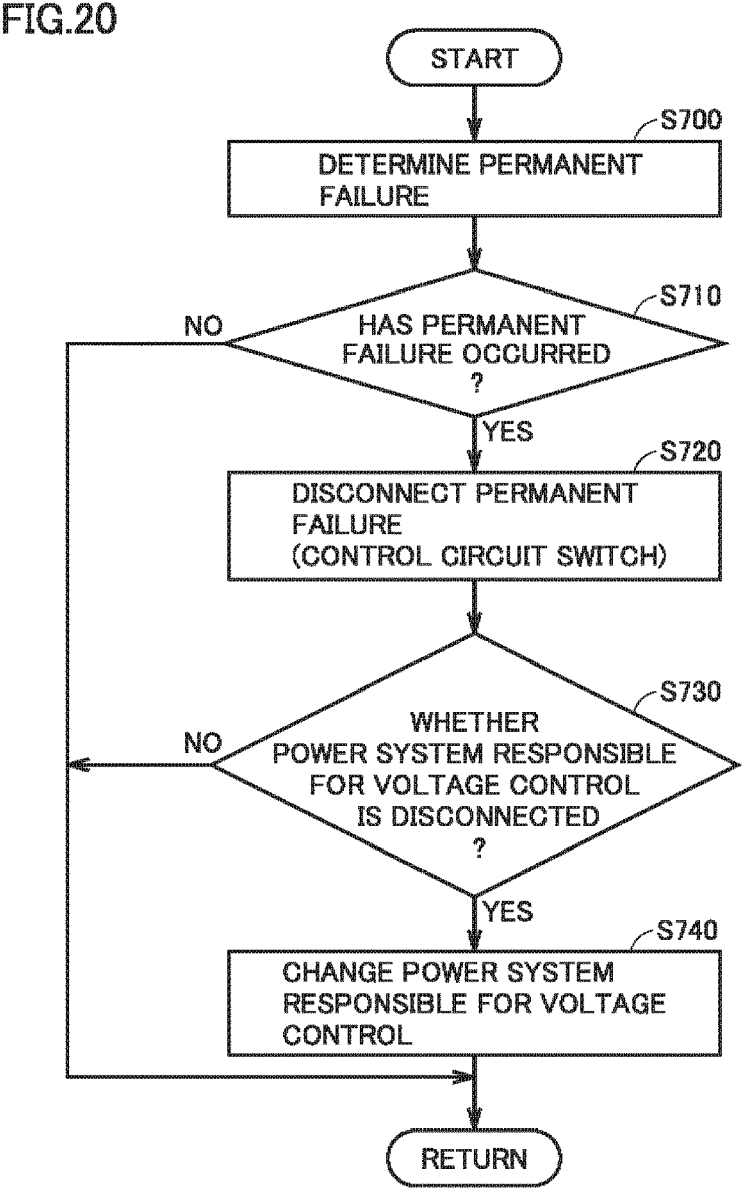
FIG. 20 is a flowchart for illustrating a control process when the DC power transmission system according to the fifth embodiment has an accident.

FIG. 20 is a flowchart for illustrating a control process performed when the DC power transmission system according to the fifth embodiment has an accident. The control process shown in FIG. 20 can be performed by control device 20 for generally controlling DC power transmission system 100#.

Referring to FIG. 20, when an accident of DC line 60 is detected in at least one of power conversion devices 30a to 30c, control device 20 performs step S700 to determine whether the accident is due to a permanent failure. Alternatively, control device 20 can detect that DC line 60 has an accident independently of power conversion devices 30a to 30c. It should be noted that the step S700 determination can be made in any known manner in the art.

When a permanent failure occurs (YES in S710), control device 20 performs step S720 to generate a command to control power line switch 650 to disconnect a DC line of a power system that has the permanent failure (i.e., any one of DC lines 60a to 60c) from power lines 65a and 65b and the DC lines of the other power systems.

Further, in step S730, control device 20 determines whether a permanent failure has occurred in a power system including power conversion device 30 responsible for voltage control. In other words, if a permanent failure occurs in a power system including power conversion device 30 which performs current control, a determination of NO is made in S730.

In response to YES in step S730, control device 20 performs step S740 to designate one of the power systems free of the permanent failure as a substitute power system responsible for voltage control. Power conversion device 30 responsible for voltage control is thus changed. Power conversion device 30 designated as a substitute responsible for voltage control performs restart control as shown in FIG. 9 and each other power conversion device 30 performs restart control according to any one of the first to fifth embodiments, so that each and every power conversion device 30 can restart from a stopped state without transmitting or receiving (or communicating) information to or from (or with) other power conversion devices 30s. Thus, after the permanent failure is disconnected, interconnection of AC systems 10a to 10c via DC line 60 is rapidly resumed.

When a determination of NO is made in step S730, that is, when a permanent failure occurs in a power system responsible for current control, control device 20 skips step S720. Thus, power conversion device 30 responsible for voltage control is maintained as it is unnecessary to change it. Each power conversion device 30 performs restart control according to any of the first to fifth embodiments without transmitting or receiving (or communicating) information to or from (or with) other power conversion devices 30s.

In contrast, when there is no permanent failure (NO in S710), control device 20 does not need to change the state of power line switch 650 (DC circuit breakers 64a to 64c all closed) and which one of power conversion devices 30a to 30c is responsible for voltage control, and accordingly, control device 20 skips steps S710 to S740 and ends the process. Each power conversion device 30 can be restarted according to any of the first to fifth embodiments without transmitting or receiving information to or from other power conversion devices 30s.

Thus, when the DC power transmission system according to the fifth embodiment in a configuration with a plurality of AC systems connected via a DC line has a permanent failure in any one of power systems, the DC power transmission system can disconnect the power system having the permanent failure and resume an interconnected operation by the remaining sound power systems by restarting power conversion device 30 stably and quickly.

Note that with respect to the plurality of first to sixth embodiments described above, including any combination that is not mentioned in the specification, a configuration described in each embodiment is intended to be combined with another, as appropriate, within a range free of inconsistency or contradiction.

While in the first to fifth embodiments, for the sake of simplicity, a DC power transmission system in which two power conversion devices 30s are arranged to correspond to two AC systems has been indicated as one example, a configuration with three or more power conversion devices 30s arranged to correspond to three or more AC systems also allows similar control by having one power conversion device 30 responsible for voltage control and the remaining power conversion devices 30s each performing current control.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST 10, 10a, 10b, 10c AC system, 20 control device, 30, 30a, 30b, 30c power conversion device, 40 terminal control device, 45 AC circuit breaker, 50 power conversion unit, 51, 51a, 51 b, 51c, 51d converter cell, 52n negative arm, 52p positive arm, 54a, 54b, 54c current detector, 55 leg circuit, 56 transformer, 57 interconnecting reactor, 58a, 58b voltage detector, 59 accident current bypass, 60, 60a to 60c DC line, 61, 61a to 61c, 62, 62a to 62c power line, 64a to 64c, 80 DC circuit breaker, 65 short circuit path, 70 current limiting circuit, 71 current limiting resistor, 72 bypass switch, 100 DC power transmission system, 200 power conversion control system, 210 capacitor voltage controller, 220 AC current controller, 230 DC voltage controller, 240 DC current controller, 245 control output synthesizer, 250 restart controller, 650 power line switch, C1, C2 capacitor, D1, D2 diode, Iarm arm current, Idc DC current, Idc* DC current command value, N3 to N6 node, Na AC terminal, Nb, Nc DC terminal, SMn1, SMn2, SMp1 to SMp3 semiconductor switching element, T1, T2 output terminal, Vcap capacitor voltage, Vcap* capacitor voltage command value, Vdc* DC voltage command value, Vdc DC voltage, kbal voltage balance control command, kiac AC current control command, kidc DC current control command, kvdc DC voltage control command.

The invention claimed is:

1. A power conversion device used for a DC power transmission system for interconnecting a plurality of AC systems via a DC line that is formed of first and second power lines, the power conversion device comprising:
a power conversion unit performing bidirectional AC/DC power conversion between one of the plurality of AC systems and the DC line;
a current breaker configured to interrupt a current flowing between the one AC system and the DC line via the power conversion unit; and
a terminal control device configured to control the current breaker and the power conversion unit,
the power conversion unit including
first and second DC terminals electrically connected to the first and second power lines, respectively,
AC terminals electrically connected to the AC system, and
a plurality of converter cells connected in series between the first and second DC terminals so as to have a point of electrical connection to the AC terminals,
the plurality of converter cells each having
a power storage element connected between a pair of output terminals, and
a plurality of switching elements connected to the power storage element in parallel or in series to control charging and discharging the power storage element for the output terminal,
in a restart operation for starting the AC/DC power conversion for controlling a DC current to be input/output to/from the DC line, from a stopped state in thick the current breaker is opened and there is established a gate blocked state in which in the power conversion unit each converter cell has the plurality of switching elements fixed in an off state, the terminal control device operating, after re-closing the current breaker, to remove the gate blocked state in response to a DC terminal voltage between the first and second DC terminals, and to start the AC/DC power conversion by turning on/cuff the plurality of switching elements in the plurality of the converter cells in response to a voltage of the power storage element after removing the gate blocked state.

2. The power conversion device according to claim 1, wherein the current breaker includes an AC circuit breaker connected between the one AC system and the AC terminals of the power conversion unit and opened and closed in response to a command received from the terminal control device.

3. The power conversion device according to claim 2, wherein when the DC terminal voltage rises above a predetermined first reference voltage in the stopped state, the terminal control device closes the AC circuit breaker and starts the restart operation.

4. The power conversion device according to claim 3, wherein the first reference voltage is set to correspond to a normal voltage range of the DC line applied when the DC power transmission system has no accident.

5. The power conversion device according to claim 3, wherein
when the DC terminal voltage rises above a predetermined second reference voltage in the restart operation with the AC circuit breaker closed, the terminal control device releases the power conversion unit from the gate blocked state, the second reference voltage being higher than the first reference voltage.

6. The power conversion device according to claim 5, wherein
in the DC power transmission system, the DC line has DC voltage controlled by another power conversion device connected between the DC line and another AC system of the plurality of AC systems, and
the second reference voltage is set to correspond to a normal voltage range of the DC line applied during a rated operation of the other power conversion device.

7. The power conversion device according to claim 1, wherein when the power storage element of each converter cell has voltage increased above a predetermined reference voltage after the stopped state is removed, the terminal control device starts the AC/DC power conversion by turning on/off the plurality of switching elements in the plurality of converter cells.

8. The power conversion device according to claim 7, wherein the reference voltage is set to correspond to a minimum voltage of the power storage element allowing the power conversion device to start a rated operation.

9. The power conversion device according to claim 1, wherein when the terminal control device detects that the DC line has an accident, the terminal control device opens the current breaker and sets the power conversion unit to the gate blocked state.

10. The power conversion device according to claim 9, wherein the terminal control device sets the power conversion unit to the gate blocked state when a DC current flowing between the power conversion device and the DC line exceeds a predetermined threshold value.

11. The power conversion device according to claim 9, wherein the terminal control device opens the current breaker and disconnects the power conversion unit from the one AC system when at least one of a first condition and a second condition is established, the first condition indicating that a DC current flowing between the power conversion device and the DC line exceeds a predetermined first threshold value, the second condition indicating that an AC current flowing through the AC terminals exceeds a predetermined second threshold value.

12. The power conversion device according to claim 1, the current breaker including an AC circuit breaker connected in series to the AC terminals for the one AC system, the power conversion device further comprising:
a current limiting resistor connected between the AC circuit breaker and the AC terminals; and a bypass switch connected to the current limiting resistor in parallel and configured to be opened and closed in response to a command received from the terminal control device, wherein the terminal control device in the restart operation turns on the bypass switch when the power storage element of each converter cell has a voltage higher than a predetermined fourth reference voltage, whereas the terminal control device in the restart operation turns off the bypass switch when the power storage element of each converter cell has a voltage lower than the predetermined fourth reference voltage.

13. The power conversion device according to claim 1, further comprising an accident current bypass that forms a current path between the first and second DC terminals bypassing the plurality of converter cells, wherein the accident current bypass is configured to form the current path to circulate short circuit current caused by an accident caused on the DC line.

14. The power conversion device according to claim 1, wherein the current breaker includes a DC circuit breaker connected between the power conversion unit and the DC line and opened and closed in response to a command received from the terminal control device, and the terminal control device opens the DC circuit breaker and disconnects the power conversion unit from the DC line when a DC current flowing between the power conversion device and the DC line exceeds a predetermined threshold value.

15. The power conversion device according to claim 14, wherein at a start of the restart operation after the DC circuit breaker is opened, the terminal control device re-closes the DC circuit breaker.

16. The power conversion device according to claim 1, wherein the current breaker includes a DC circuit breaker connected between the power conversion unit and the DC line and opened and closed in response to a command received from the terminal control device.

17. The power conversion device according to claim 16, wherein in the restart operation after the DC circuit breaker is opened, the terminal control device re-closes the DC circuit breaker when the power storage element of each converter cell has a voltage increased to a voltage allowing the power conversion device to start a rated operation after the power conversion unit is released from the gate blocked state.

18. A DC power transmission system for interconnecting a plurality of AC systems via a DC line, comprising a plurality of power conversion devices each disposed between the DC line and one of the plurality of AC systems, the plurality of power conversion devices each performing bidirectional AC/DC power conversion between an associated one of the plurality of AC systems and the DC line, the plurality of power conversion devices further including a first power conversion device configured to control a DC voltage of the DC line by the AC/DC power conversion in response to a voltage command value, and a second power conversion device configured to control a DC current input/output to/from the DC line by the AC/DC power conversion in response to a current command value, the second power conversion device being composed of the power conversion device according to claim 1.

19. The DC power transmission system according to claim 18, the DC line being disposed for each of the plurality of AC systems, further comprising:

a power line switch having a DC circuit breaker connected between a power line common to the plurality of AC systems and each DC line; and a control device configured to control the power line switch, wherein when a permanent failure occurs on the DC line in any of the plurality of AC systems, the power line switch disconnects the DC line having the permanent failure from the common power line and each other DC line.

* * * * *

UNITED STATES PATENT AND TRADEMARK OFFICE
CERTIFICATE OF CORRECTION

PATENT NO. : 10,790,761 B2
APPLICATION NO. : 16/479252
DATED : September 29, 2020
INVENTOR(S) : Takuya Kajiyama et al.

Page 1 of 1

It is certified that error appears in the above-identified patent and that said Letters Patent is hereby corrected as shown below:

In the Claims

Claim 1, Column 23, Line 62, "on/cuff" should be --on/off--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*